(12) United States Patent
Nagasaki et al.

(10) Patent No.: US 6,317,156 B1
(45) Date of Patent: Nov. 13, 2001

(54) PRINTER INCORPORATED TYPE ELECTRONIC CAMERA AND MEMBER TO BE RECORDED

(75) Inventors: Tatsuo Nagasaki, Yokohama; Yutaka Adachi, Hachioji; Kuniaki Saito, Tokorozawa; Akira Shimizu; Toshiyuki Ebihara, both of Hino, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/906,310

(22) Filed: Aug. 5, 1997

(30) Foreign Application Priority Data

Aug. 7, 1996 (JP) .................................................. 8-208503

(51) Int. Cl.$^7$ .................................................. H04N 5/225
(52) U.S. Cl. .................................................. 348/373; 348/207
(58) Field of Search .................................................. 348/220, 207, 348/373, 231, 233; 396/512; 358/906, 1.15; 347/2, 3, 171, 214; 400/207, 208, 208.1

(56) References Cited

U.S. PATENT DOCUMENTS

| | | | |
|---|---|---|---|
| 4,746,932 | * 5/1988 | Sato | 358/1.15 |
| 5,051,838 | * 9/1991 | Cho et al. | 358/401 |
| 5,111,216 | * 5/1992 | Richardson | 347/171 |
| 5,435,657 | * 7/1995 | Pearce et al. | 400/208 |
| 5,533,818 | * 7/1996 | Bahradi | 400/208 |
| 5,606,420 | * 2/1997 | Maeda | 358/296 |
| 5,748,326 | * 5/1998 | Thompson-Bell et al. | 358/296 |

FOREIGN PATENT DOCUMENTS

| | | | |
|---|---|---|---|
| 62-188870 | 12/1987 | (JP) . | |
| 3-26073 | 2/1991 | (JP) . | |
| 3-28837 | 2/1991 | (JP) . | |
| 3-29471 | 2/1991 | (JP) . | |
| 3-34684 | 2/1991 | (JP) . | |
| 5-64045 | 3/1993 | (JP) . | |
| 5-53383 | 7/1993 | (JP) . | |
| 6-311317 | 11/1994 | (JP) . | |
| 9-46563 | 2/1997 | (JP) . | |
| 05064045A | * 3/1993 | (JP) | H04N/5/225 |
| Hei 5-583383 | * 7/1993 | (JP) | H04N/5/76 |

* cited by examiner

*Primary Examiner*—Wendy R. Garber
*Assistant Examiner*—Alicia M. Harrington
(74) *Attorney, Agent, or Firm*—Volpe and Koenig, P.C.

(57) ABSTRACT

A printer incorporated type electronic camera composed of an imaging unit including an imaging lens and a CCD, a printer unit, a cassette information detecting/recording unit, a tape cassette in which a recording tape having an adhesive agent applied to the back surface thereof is wound and accommodated and which can be detachably loaded and a controller for controlling respective elements. A subject image captured by the imaging unit is printed on recording tape in the tape cassette by the printer unit. Processing for fitting an image captured from an external source to the print image, and the like can be carried out. The tape cassette for print can be easily loaded to the printer incorporated type electronic camera and further the camera is less expensive. Since the radius of curvature of the recording tape when it is fed out is smaller that when it is accommodated, the recording tape can be easily exfoliated.

13 Claims, 25 Drawing Sheets

PRINTER INCORPORATED TYPE ELECTRONIC CAMERA AND MEMBER TO BE RECORDED

BACKGROUND OF THE INVENTION

1. Field of the Invention

The present invention relates to a printer incorporated type electronic camera and a member to be recorded thereof, and more specifically, to a printer incorporated type electronic camera which incorporates a printer therein and a member to be recorded thereof.

2. Description of the Related Art

Recently, electronic still cameras incorporating an imaging element therein have been put on the market by various manufactures and widely used. Further, various types of electronic still cameras in which a printer is incorporated have been also developed or put on the market.

The conventional printer incorporated type electronic still cameras, many of which are a monochrome type, employ a heat sensitive system using heat sensitive paper, a heat sublimation system using ordinary paper and an ink ribbon or a heat melting system as a print system. In any of the systems, a sheet-shaped or roll-tape-shaped recording paper for print is directly loaded to an electronic camera main body for making print thereon. Examples of the conventional camera employing roll-type shaped recording paper are disclosed in Japanese Patent Laid-Open No. 9-46563 (laid open; Feb. 14, 1997) and Japanese Utility Model Laid-Open No. 62-188870 (laid open; Dec. 1, 1987).

Since many of the conventional printer incorporated type electronic still cameras are the monochrome type, however, when these cameras are arranged as a color type, they become expensive. In addition, since they incorporate a printer unit, there is a possibility that the external size of their camera main body is increased.

Further, the conventional printer incorporated type electronic still cameras also have a drawback that it is difficult for users to handle them because they must directly load the sheet-shaped or roll-tape-shaped recording paper for print to the camera main body.

OBJECT AND SUMMARY OF THE INVENTION

An object of the present invention made to solve the above disadvantages is to provide a printer incorporated type electronic camera including an imaging element to which a member to be recorded for print can be easily loaded and which is less expensive and a member to be recorded for the electronic camera.

A printer incorporated type electronic camera of the present invention having an image data forming unit for forming image data corresponding to the image of a subject imaged by an imaging optical system and a printer unit for printing an image represented by the picture data formed by the image forming unit with the image data forming unit and the printer unit being disposed in a case is arranged such that the printer unit carries out print operation using a tape cassette in which a recording tape is wound and accommodated.

A member to be recorded of the present invention is arranged to be suitable to a printer incorporated type electronic camera having an image data forming unit for forming image data corresponding to the image of a subject imaged by an imaging optical system and a printer unit for printing an image represented by the picture data formed by the image forming unit with the image data forming unit and the printer unit being disposed in a case. The member to be recorded is a tape cassette in which wound and accommodated is a recording tape composed of a heat sensitive recording paper having an adhesive agent applied to the back surface thereof and a base paper bonded to the back surface of the heat sensitive recording paper so as to be exfoliated therefrom. Further, the member to be recorded is a tape cassette in which wound and accommodated separately or together are a recording tape composed of a heat sensitive recording paper having an adhesive agent applied to the back surface thereof and a base paper bonded to the back surface of the heat sensitive recording paper so as to be exfoliated therefrom and an ink tape for executing print to the recording paper of the recording tape. A cutout is formed to the recording paper of the recording tape accommodated in the tape cassette to permit the recording paper to be easily exfoliated from the base paper corresponding thereto, the recording paper is accommodated in the tape cassette by being wound in such a manner that it is disposed to the outside of the recording tape and the base paper is disposed to the inside thereof and the maximum radius of curvature of the feed passage for the recording tape taken out from the cassette is set smaller than the maximum radius of curvature of the recording tape wound in the cassette.

Other features and advantages of the present invention will be sufficiently apparent from the following description taken in conjunction with the accompanying drawings.

DESCRIPTION OF THE PREFERRED EMBODIMENT

Embodiments of the present invention will be described below with reference to the accompanying drawings.

Figure 1:
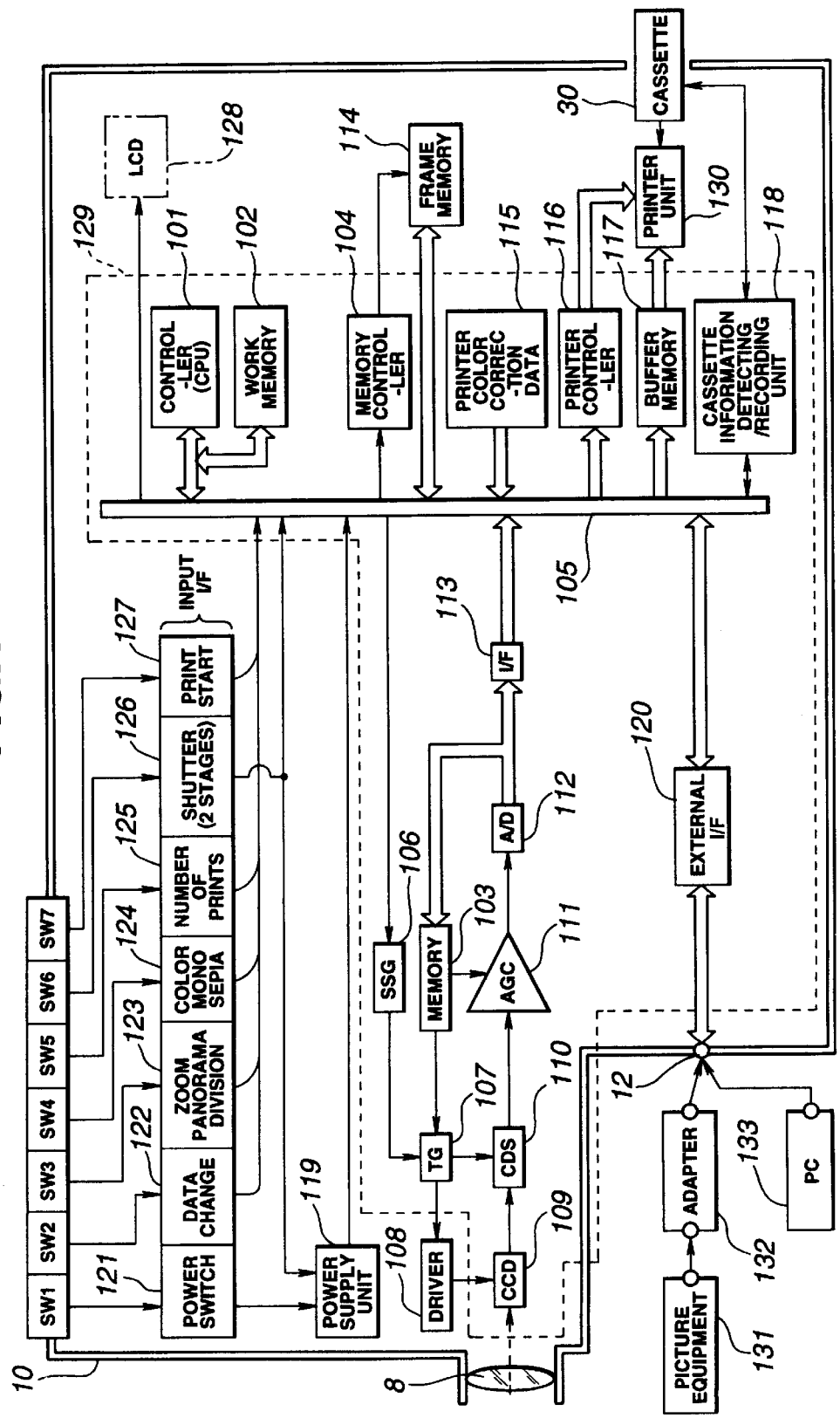
FIG. 1 is a block diagram showing the arrangement of an electronic control circuit in a printer incorporated type electronic camera of an embodiment of the present invention.
Figure 2:
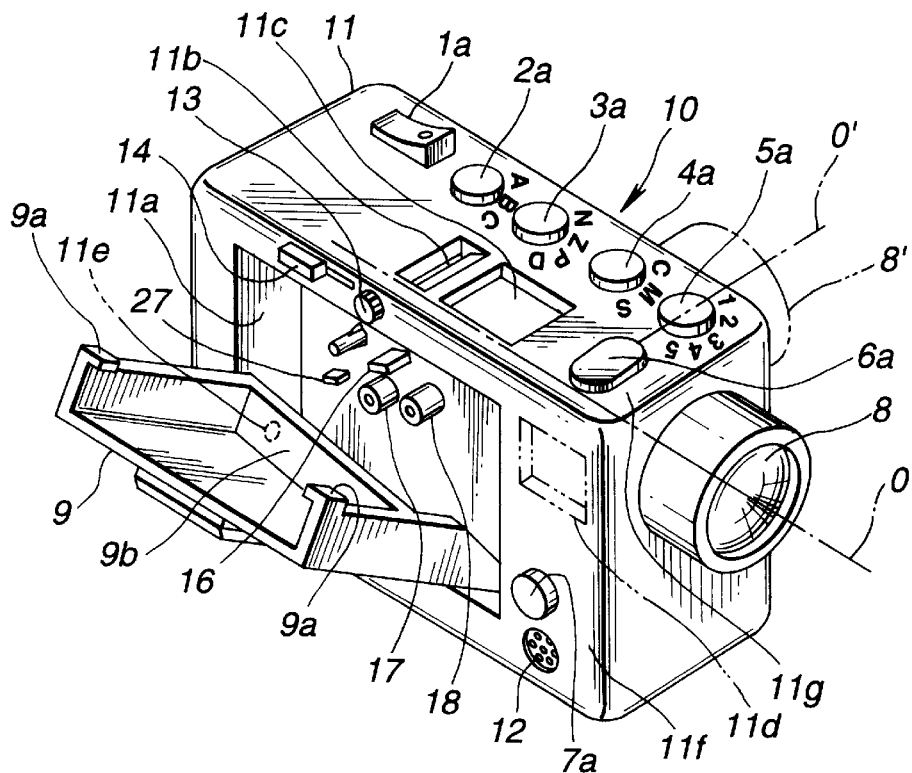
FIG. 2 is a perspective view of the outside appearance of the printer incorporated type electronic camera in FIG. 1.
Figure 3:
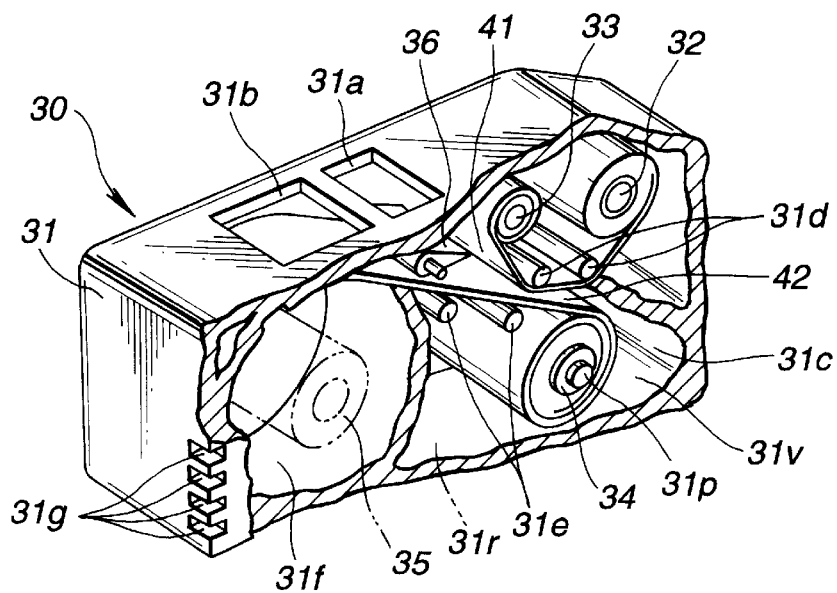
FIG. 3 is a perspective view showing the interior of a tape cassette which can be loaded to the printer incorporated type electronic camera in FIG. 1.

FIG. 1 is a block diagram showing the arrangement of the electric control circuit and the connecting device of a printer incorporated type electronic camera showing an embodiment of the present invention, FIG. 2 is a perspective view of the outside appearance of the electronic camera and FIG. 3 is a perspective view showing the interior of a printer cassette which can be loaded to the electronic camera.

The printer incorporated type electronic camera 10 of the embodiment can be loaded with a tape cassette 30 (see FIG. 3) as a cassette type member to be recorded in which an ink tape (ink ribbon) and recording tape are accommodated. The ink tape is formed by connecting tapes each having three colors C (cyan), M (magenta) and Y (yellow) for a picture. The electronic camera 10 can print a still image on a recording paper by a printer unit 130 (see FIG. 1) incorporated therein based on the image data of a subject which has been converted into an electric signal through an imaging element, external image data or the like. A heat sublimation transfer system or a heat melting transfer system is employed as the printing system of the printer unit 130. Further, a heat sensitive system may be employed, in which case the ink tape is not necessary and heat sensitive paper is used as the recording paper.

First, how the electric control circuit of the printer incorporated type electronic camera 10 is arranged and operated will be described with reference to FIG. 1 and the like. It is assumed in the electric control circuit that all the control elements are controlled by a CPU 101 as a system controller through a common bus line 105. Note, a specific method of transferring data between the CPU 101 and the respective control elements is disclosed in Japanese Unexamined Patent Publication No. 3-58685 titled as "Digital Electronic Still Camera".

The CPU 101 may be disposed on a single chip together with a work memory 102. The work memory 102 is composed of a RAM used to calculate a color conversion matrix and average the number of images to be converted and a ROM in which data for calculation systems for processing various images, and the like are stored.

The electric control circuit includes a power switch SW1 as an operation switch, an input data changeover switch SW2 for indicating to capture external data, a picture mode changeover switch SW3 for designating the state of a printed image (normal, zoom, panorama, division to multiple images), a color designation switch SW4 for designating the color of a printed image (color, monochrome, sepia), a print number switch SW5 for designating the number of prints, a two-stage shutter switch SW6 as trigger means and a print start switch SW7 for instructing the start of print.

Signals output from these switches are input to respective input I/Fs, that is, to a power switch I/F 121, an external data changeover I/F 122, a zoom, panorama, division mode changeover I/F 123, a color, mono, sepia changeover I/F 124, a number of print changeover I/F 125, a shutter I/F 126, and a print start I/F 127, respectively and transferred to the CPU 101 through the common bus line 105.

In the electric control circuit, when an ON signal is output from the first stage of the two-stage shutter switch SW6 by operating the shutter SW6 in the state that the power switch SW1 is turned on, a power supply unit 119 is operated in response to the outputs from the power switch I/F 121 and the shutter IF 126 and the CPU 101 and the like are set up.

Rays from a subject incident on an imaging lens 8 as an imaging optical system in the state that the CPU 101 and the like are set up is photoelectrically converted by a CCD 109 as an imaging element and output as an imaging signal. Note, the drive timing signal of a timing generator (TG) 107 is created by the synchronous signal of a synchronous signal generator (SSG) 106 which is controlled by the CPU 101 and the CCD 109 is driven by the timing signal through a driver 108 to thereby create the imaging signal.

The imaging signal is subjected to sample holding processing by a correlation double sampling circuit (CDS) 110 and further subjected to A/D conversion by an A/D conversion circuit 112 through an AGC circuit 111 and captured to a memory 103 as an imaging signal for a first frame. AE processing, that is, the adjustment of an element shutter and the gain adjustment of the AGC circuit 111 are executed based on the data of the memory 103.

Subsequently, when an ON signal is output from the second stage of the shutter switch SW6, a subject image is captured to the CCD 109 as an image signal under the exposure conditions based on the AE processing and the imaging data having been subjected to the A/D conversion is stored in a frame memory 114 through a data I/F 113 as the image data of the subject image.

The data is stored in the frame memory 114 by being controlled by a memory controller 104. A mass storage such as a memory card or the like may be applied to the frame memory 114.

The CPU 101, the imaging data processing circuit from the CCD 109 to the data I/F 113, the memory controller 104, and the frame memory 114 constitute an image data formation unit for forming image data corresponding to the subject image.

Next, when the print switch start SW7 for instructing the start of print is depressed, the signal output therefrom instructs the CPU 101 to start print through the print start I/F 127. Then, a printer unit 130 composed of a print head 16 and the like (see FIG. 2) incorporated in the electronic camera is driven through the printer controller 116 and print is executed to a recording paper 42 accommodated in the tape cassette 30 based on the image data on the frame memory 114.

Since the data imaged by the CCD 109 is image data of an R (red), G (green), B (cyan) system, however, the image data stored in the frame memory 114 must be converted into a C (cyan), M (magenta), Y (yellow) system which is used to the output by the printer unit. Further, since the number of pixels of the image imaged by the CCD 109 is different from the number of pixels of the print made by the print head of the printer unit 130, and further in order to execute enlarged (zoomed) print or panorama size print, a plurality of image data of the above stored image data must be averaged and converted into image data of a single pixel.

Data for executing matrix conversion from the RGB system to the CMY system, data for executing averaging processing and the like are stored in the work memory 102 arranged on the single chip together with the CPU 101 and the conversion processing is executed by the CPU 101 based on the data.

Further, when print is executed by the printer unit 130, although color correction such as gamma correction and the like must be executed, it is executed by the CPU 101 using color interpolation data for the printer which is stored in a color correction data ROM 115.

The data having been converted and corrected based on the data in the frame memory 114 is output to a buffer memory 117 and print is executed by the printer unit 130 based on the data in the buffer memory 117.

Note, when a filter of the CMY system is applied in place of the color filter of the RGB system used in the CCD 109 and all the image processing is executed using a complementary color system, the above calculation for the color conversion from the RGB system into the CMY system which is executed by the CPU 101 becomes unnecessary and the circuit is simplified.

Subsequently, image data from an external device such as, for example, the other video device 131 and a personal computer 133 or an image processing command can be captured by operating the data changeover switch SW2.

That is, when the video device 131 such as a television, a video recorder, a tuner and the like is connected to an external connector 12 through an adapter 132, the operation of the data changeover switch SW2 permits external image data or character data to be captured to the frame memory 114 in the electronic camera 10 by an external data I/F 120 as a unit to which data to be printed is input. A keyboard, bar code input keys, a background data ROM, a video capture, a data conversion processing unit and the like are assembled to the adapter 132, so that character data which is input through the keyboard, the bar code, the background data and the like can be captured in addition to the image data of the above television and the like.

The personal computer 133 can be also connected to the connector 12 so that the CG image data and the like created by the personal computer 133 can be captured. In addition, an image processing command can be captured from the personal computer 133 and an image processed according to the command can be also printed.

The external data is captured to the frame memory 114 through the common bus line 105 under the control of the CPU 101. When, for example, the external data is used as image data such as a background, superimposed or the like to the image of a subject imaged through the CCD 109, however, the image data of the subject is put onto the image data of the subject by a mixing processing unit incorporated in the CPU 101. The image data having been subjected to the mixing processing is output to the printer unit 130 and print is carried out to the frame of the same recording paper.

Note, when the image data of the video device 131 such as the television and the like is captured, it is captured as still image data by freeze processing the image data of a moving image by operating the second stage of the two-stage shutter switch SW6 for imaging the subject. Whether the image data captured from the video device 131 is printed or the image data of the subject image captured from the CCD 109 is selected by a selection processing unit incorporated in the CPU 101 according to the output from the data changeover switch SW2 and selected image data is printed by the printer unit 130.

When the tape cassette 30 (see FIG. 3) is loaded to a camera main body 11 (see FIG. 2), information necessary to print operation which is executed on the electronic camera 10 side such as the specification of the recording paper accommodated in the cassette and how the recording paper is used must be transferred to the electronic camera 10. Further, information as to how the accommodated recording paper is used such as whether it has been entirely used or not, and the like must be recorded to the tape cassette 30.

To cope with this problem, the electronic control circuit is provided with a cassette information detecting/recording unit 118 so that it can pass information to and receive information from the tape cassette 30.

Note, the cassette information detecting/recording unit 118 also captures information and outputs information using the CPU 101 through the bus line 105. The cassette information detecting/recording unit 118 is composed of a cassette information detecting switch 25 (see FIG. 5(A), FIG. 5(B)), a recording paper remaining amount detecting switch 26 (see FIG. 6), a press mechanism 63 (see FIG. 35) as recording means for recording that the tape cassette 30 has been consumed to the tape cassette 30, a used recording tape detecting switch 62 (see FIG. 36) as held information reading means and the like.

Further, there is provided a reflection type light sensor 27 for detecting the printing position of a recording tape 42.

In the electric control circuit, original image data such as the subject image and the like is converted into image data which is unfolded in correspondence to each picture such as a normal, zoom, panorama, or multiple divided picture and printed, in which the data conversion processing of the original image is carried out by the normal image forming means, zoom image forming means, panorama image forming means and multiple-divided-image forming means which are incorporated in the CPU 101.

Note, although the above electric control circuit employs the CCD 109 as the imaging element, any type of an image element such as an imaging element of an MOS type or a CMOS type, a CMD type or like may be employed in addition to the above. When the imaging element of any of the MOS type, CMOS type, the CMD type or like is employed, the block 129 surrounded by a dash like in the block diagram of FIG. 1 can be composed of a CMOS type one chip LSI, which is effective to reduce cost.

Next, the mechanical structure and the like of the electronic camera 10 of the embodiment will be described.

As shown by the perspective view of FIG. 2, in the camera main body 11 as the case of the printer incorporated type electronic camera which takes such an attitude that the optical axis O of the imaging lens 8 is directed in a horizontal direction, when it is assumed that the outside surfaces of the camera main body 11 along a direction vertical to the optical axis O are represented by exterior side surfaces 11ƒ and an upper surface is represented by an exterior upper surface 11g, the camera main body 11 is arranged as an approximately rectangular prism with the exterior side surfaces 11ƒ having a surface larger than that of the exterior upper surface 11g.

The opening 11a of a cassette tape loading portion is disposed to one of the exterior side surfaces 11ƒ and a cassette lid 9 as a lid member is disposed thereto by being turnably supported by support pins 11e. The cassette lid 9 can hold the tape cassette 30 at a predetermined position and an inclined receiving surface 9b is formed to the cassette lid 9 to prevent the tape cassette 30 from being reversely held and holding claws 9a are also formed to on the cassette lid 9.

The exterior side surface 11ƒ also includes the operation button 7a of the print start switch SW7 and an external connector 12 each disposed thereto. Also disposed above the opening 11a are a turnable feed changeover knob 13 for switching the feed direction of the recording tape 42 having been printed, that is, switching whether it is discharged to the outside of the camera or it is accommodated in the tape cassette 30 and a cutting operation knob 14 for cutting the printed recording tape 42 which is discharged.

The exterior upper surface 11g includes operation buttons 1a, 2a, 3a, 4a, 5a and 6a for operating the power switch SW6, the input data changeover switch SW2, the picture mode changeover switch SW3, the color designation switch SW4, the print number switch SW5, the two-stage shutter switch SW6 in the electric control circuit each disposed thereto, respectively. Further, a discharge port 11b through which the recording tape 42 having been printed is discharged and a view port 11c for confirming the printed state of the recording tape 42 which has been printed and is accommodated in the main body are also disposed to the upper surface.

Figure 4:
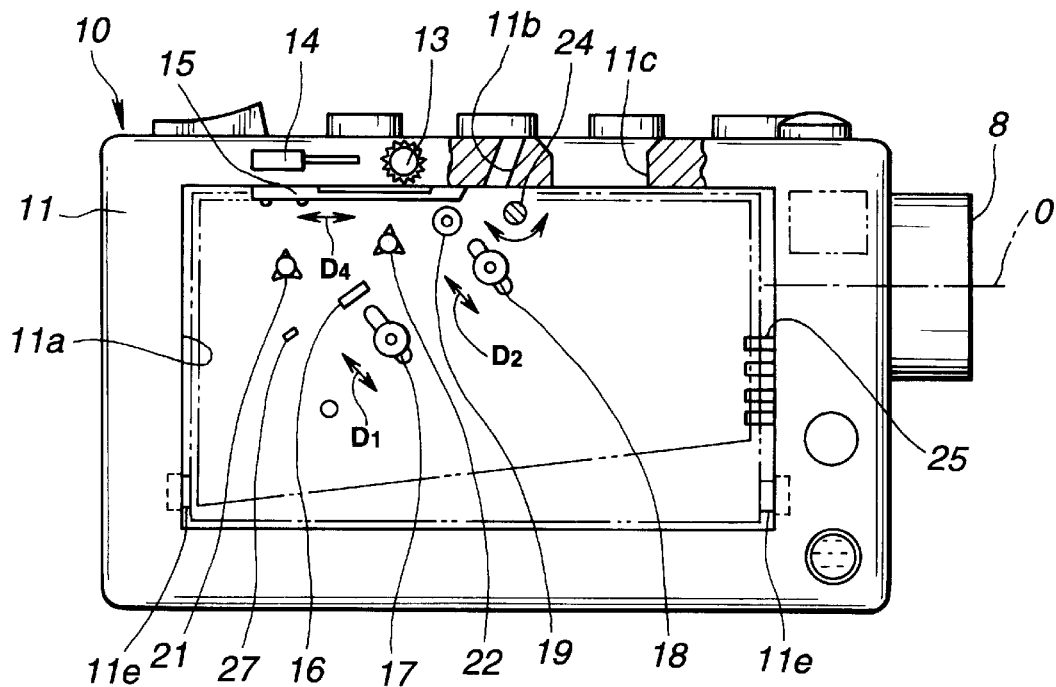
FIG. 4 is a view showing the tape cassette loading portion of a camera main body in the printer incorporated type electronic camera in FIG. 1.

As shown in FIG. 4, disposed in the opening 11a of the cassette loading portion are the print head 16, a platen roller 17 as a presser roller which confronts the print head 16 and is supported so as to advance and retreat in a direction D1, a feed roller 18 which constitutes a recording tape feed mechanism and can advance and retreat in a direction D2, a roller 19, ink tape drive shafts 21, 22 and a changeover drive shaft 24 which is driven by the feed changeover knob 13 and can be engaged with the shaft portion of the feed changeover plate 36 of the tape cassette 30.

Note, the reflection type light sensor 27 is disposed on a recording tape feed passage to detect the feed position of the recording tape 42. Although not shown in FIG. 4, the remaining amount detecting switch 26 (se FIG. 6) of the recording tape 42 in the tape cassette 30 and a used cassette tape detecting switch 62 (see FIG. 36) are also disposed in the opening 11a.

Disposed to the upper surface of the tape cassette loading portion is a cutter blade 15 as a cutter mechanism which is driven in a direction D4 by operating the cutting operation knob 14.

Four cassette information detecting switches 25 which constitute the cassette information detecting/recording unit 118 are disposed to the side surface where the cassette tape loading portion is disposed to detect the presence or absence of recesses 31g formed to a tape cassette main body 31.

Next, the structure of the tape cassette 30 as a member to be recorded which can be loaded to the printer incorporated type electronic camera will be described. As shown in the perspective view of FIG. 3, the outside configuration of the tape cassette 30 is formed such that the tape cassette main body 31 is formed to have an asymmetrical shape, the bottom surface thereof forms an inclined surface 31r so that the tape cassette 30 is prevented from being reversely inserted into the cassette lid 9. Openings 31a and 31b are formed to in the upper surface of the tape cassette main body 31 so that they are located at positions which confront the discharge port 11b and the view port 11c of the camera main body when the cassette is loaded to the camera.

The comb-shaped recesses 31g as information holding means are formed to the side surface of the tape cassette main body 31 at a position where the actuators of the cassette information detecting switches 25 disposed to the camera can be in contact with the recesses 31g. Cassette information inherent to the ink tape, the recording tape and the like which is the information of the accommodated cassette is recorded as 4-bit data by the presence or absence of the recesses 31g.

The cassette information as to the ink tape includes such information as whether an accommodated ink tape 41 is a heat melting type or a heat transfer type, a tape width, a length per a picture, the order of ink colors (C-M-Y, Y-M-C etc.), whether panorama print is possible or not, the name of a manufacturer, and the like.

The cassette information as to the recording tape includes such information as the amount of information which can be recorded to an accommodated recording tape 42, whether the accommodated recording tape 42 is provided with a cutout or not, a picture pitch and a cutout frame shape when the recording tape 42 is provided with the cutout, whether the recording tape 42 is provided with a remaining number code or not, color of a recording paper or a base paper, a reflectance ratio, whether a background is printed or not, types and the like of the background, whether panorama print is possible or not, the thickness and width of the recording tape, whether the recording tape is used for printing or cleaning, and the like. Further, whether the cassette is properly loaded or not is also transferred as the cassette information.

When the cassette information is captured to the camera, the camera is controlled by the CPU 101 as described below. That is, the cassette information of the loaded tape cassette 30 is read through the cassette information detecting switches 25. A driving system of the print head 16 is selected depending upon the information as to whether the ink tape 41 is the heat melting type or the heat transfer type. A recordable number of the recording tape when the cassette is loaded is set based on the information of the recordable number thereof. Note, any of 24 frames and 36 frames may be selected as the recordable number of the recording tape. When a bar code, a magnetic tape or a ROM is employed as recording means, the cassette can be used even if it is reloaded.

Further, a recording picture size is set based on the width information of the recording tape and the driving state of the print head 16 is controlled accordingly. It is possible to permit only the cassettes specified by maker information to be printed. The camera is switched to a cleaning mode based on cleaning information and cleaning is carried out. When it is detected that the cassette has been used, error information is displayed, and the operation of the camera is stopped to thereby prevent recording from being effected to the cassette again. As described above, the operation of the camera side is controlled based on the cassette information captured to the camera. This control is mainly carried out by the controller 101.

Hollow shafts 32, 33 are rotatably disposed in the cassette main body 31. The ink tape 41 is wound around the hollow shaft 32 and supported thereby and an end of the ink tape 41 is secured to the hollow shaft 32. The other end of the ink tape 41 is secured to the hollow shaft 33.

In a roll chamber 31v, a cylindrical core member 34 is rotatably inserted onto a support shaft 31p and the tape-shaped recording tape 42 is wound around the cylindrical core member 34. An end of the recording tape 42 is secured to the cylindrical core member 34.

To prevent the interference of the ink tape 41 with the recording tape 42 when they are loaded to the camera, guide pins 31d, 31e are disposed along their feed passages. Further, the feed changeover plate 36 which constitutes a turnable feed changeover mechanism for determining a feed direction of the recording tape 42 is disposed below the opening 31a. When the tape cassette 30 is loaded to the camera main body 11, the shaft portion of the feed changeover plate 36 is engaged with the changeover drive shaft 24 on the camera side and turned by the shaft 24.

Note, the feed changeover plate 36 may be provided with the camera main body in place of being disposed in the tape cassette, by which the cost of the tape cassette can be more reduced.

The roll chamber 31v in which the recording tape 42 is accommodated is swelled on the side thereof opposite to a feed side to thereby form an escape portion 31c which serves as a space for preventing the recording tape 42 from being jammed even if a predetermined number of pictures, for example, the recording tape which covers the five frames of print pictures is fed in a reverse direction.

A cylindrical or curved accommodating chamber 31f is disposed at a position confronting the roll chamber 31v of the recording tape 42 to accommodate the recording tape 42 having been printed in a curled state. A rotatable roller 35 may be disposed in the accommodating chamber 31f, by which the recording tape 42 having been printed can be more securely accommodated without causing a jam.

When the lid of the tape cassette main body 31 is arranged to be opened, the ink tape 41 and the recording tape 42 can be easily refilled. An electronic camera driving battery (not shown) is incorporated in the tape cassette main body 31. It suffices for the battery only to supply electric power for supporting the print operation to the recording tape accommodated in the tape cassette 30.

Figure 5A:
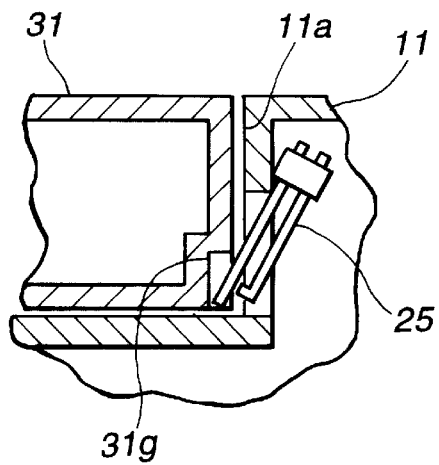
FIG. 5(A) is a sectional view showing the OFF operating state of a cassette information sensing switch in the printer incorporated type electronic camera in FIG. 1.
Figure 5B:
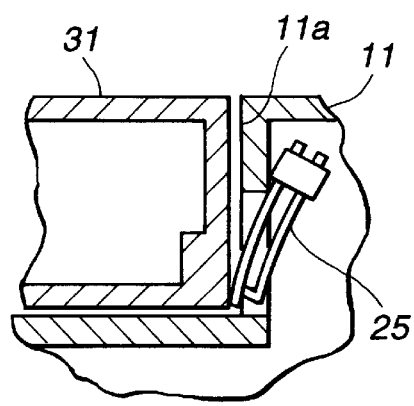
FIG. 5(B) is a sectional view showing the ON operating state of the cassette information sensing switch in the printer incorporated type electronic camera in FIG. 1.

FIG. 5(A) and FIG. 5(B) are sectional views showing the ON/OFF states of the cassette information detecting switches 25 and show a state that the tape cassette 30 is loaded to the camera main body 11.

FIG. 5(A) shows that when the recesses 31g exist in confrontation with the detecting switches 25, the detecting switches 25 keep an OFF state, whereas FIG. 5(B) shows that when the recesses 31g do not exist in confrontation with the detecting switches 25, the detecting switches 25 are in an ON state. The cassette information represented by the 4 bits is captured to the CPU 101 by the turning ON and OFF of the four detecting switches 25.

Figure 6:
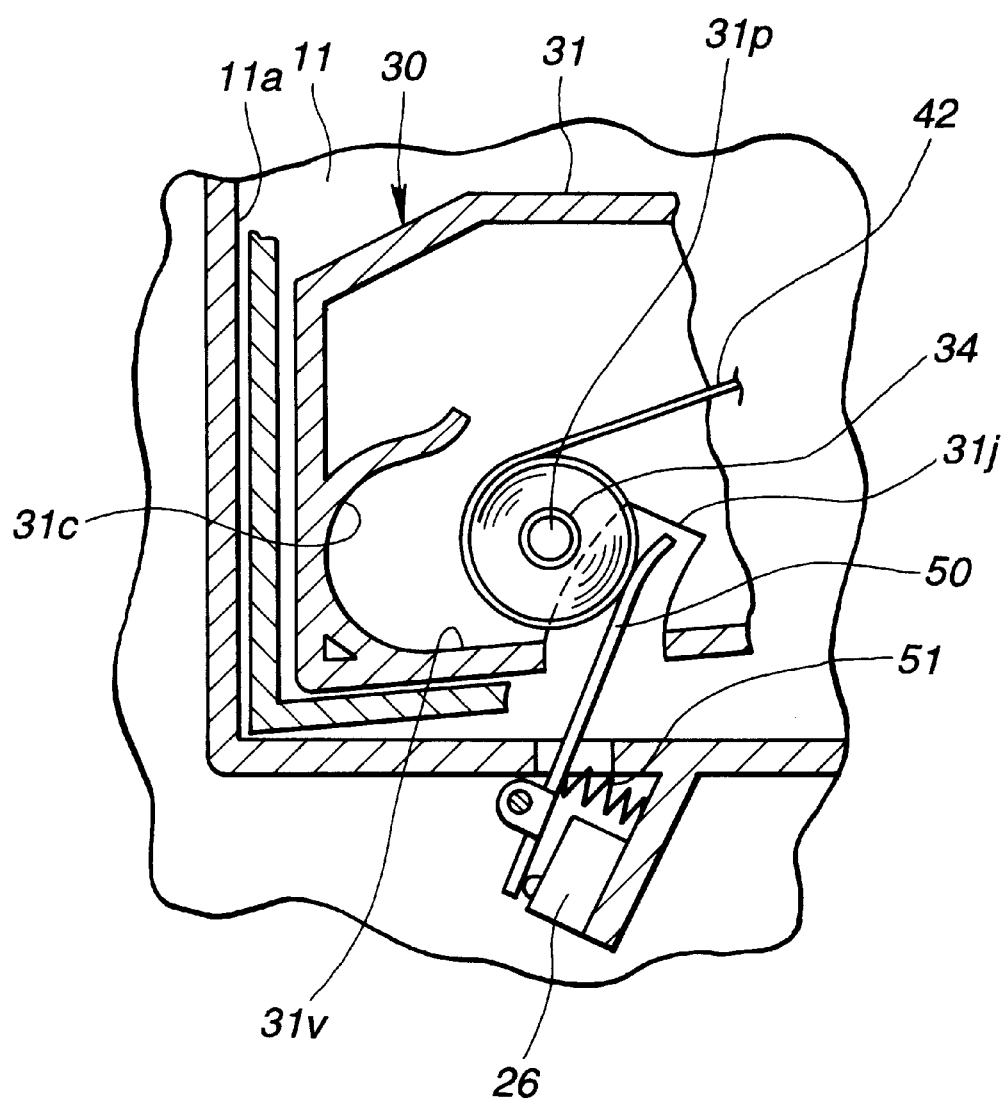
FIG. 6 is a view showing a tape remaining amount sensing unit in the printer incorporated type electronic camera in FIG. 1.

FIG. 6 is a view showing a tape remaining amount sensing unit for detecting the remaining amount of the recording tape which has been wound and accommodated. When the tape cassette 30 is loaded, the actuator 50 of the remaining amount detecting switch 26 mounted to the camera main body 11 is inserted into the tape cassette main body through an opening 31j as a mechanism to be detected and abutted against the outside diameter potion of the wound recording tape 42 by the urging force of a spring 51.

When the accommodated recording tape 42 reaches its tape end by the execution of print operation, the output from the remaining amount detecting switch 26 is changed to an ON state and the signal output therefrom is transferred to the CPU 101 as the control means. When the CPU 101 finds that the tape end has been reached, it instructs to stop the print operation (retreat of the print head and the like) and stop the image data forming operation (does not operate the shutter), informs this state to the operator (notification by the display through a LCD or by a buzzer) and records cassette using information indicating that the recording tape has been used by, for example, bending a metal connection piece 31n shown in FIG. 35.

When a potentiometer is used in place of the remaining amount detecting switch 26, since the remaining amount of the recording tape can be quantitatively detected at all times, the control such as the print operation stop and the like can be finely executed, so that the electronic camera can be more easily used. In addition, it is convenient to make it possible to manually input a remaining number of the recording tape taking it into consideration to take out the tape cassette 30 once in the midway of use thereof.

Figure 7:
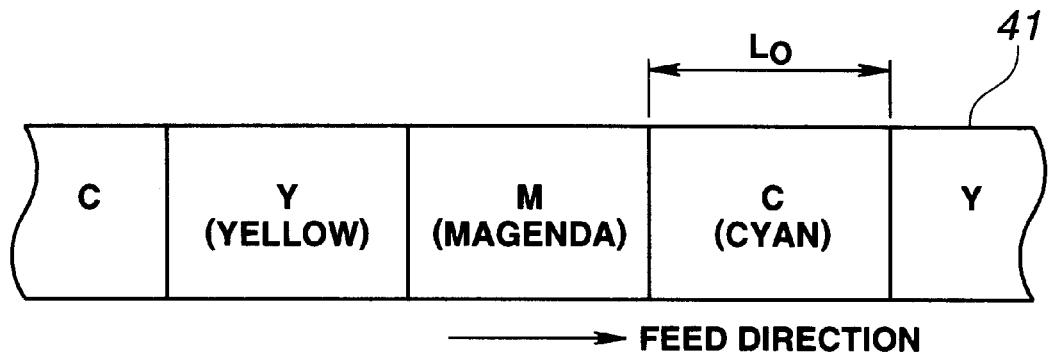
FIG. 7 is an unfolded view of a normal size printing ink tape accommodated in the tape cassette of the printer incorporated type electronic camera in FIG. 1.

FIG. 7 is an unfolded view of a normal size printing ink tape 41 which will be accommodated in the tape cassette 30.

The ink tape 41 is formed by connecting respective ink tape portions in the sequence of the colors C, M, Y and the respective portions have a length L0 which is necessary to print one picture of the normal size. Note, a color K (black) may be added in addition to the above three colors C, M, Y.

Figure 8:
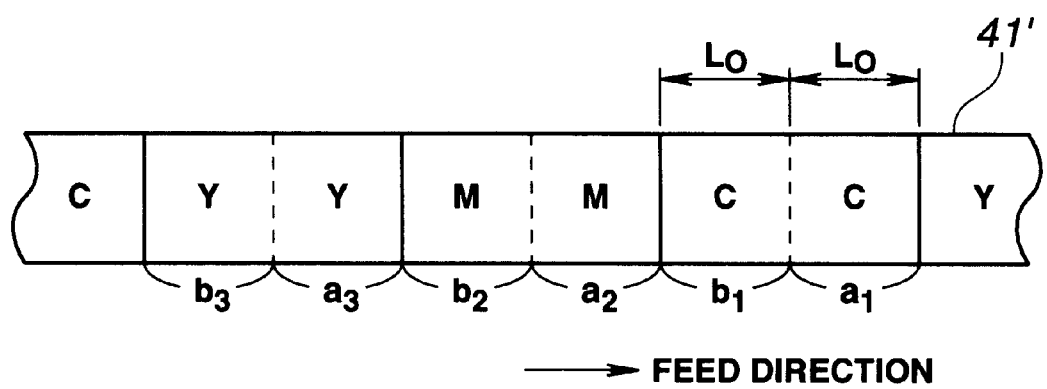
FIG. 8 is an unfolded view of a panorama size printing ink tape accommodated in the tape cassette of the printer incorporated type electronic camera in FIG. 1.

FIG. 8 is an unfolded view showing a portion of a panorama size printing ink tape 41' which can be accommodated in the tape cassette 30. The ink tape 41' is formed of tape portions in the sequence of the colors of C, M, Y and each portion has a length, for example, twice as long as the above length L0 to cover the length which is necessary to print one picture having a panorama size.

Figure 9:
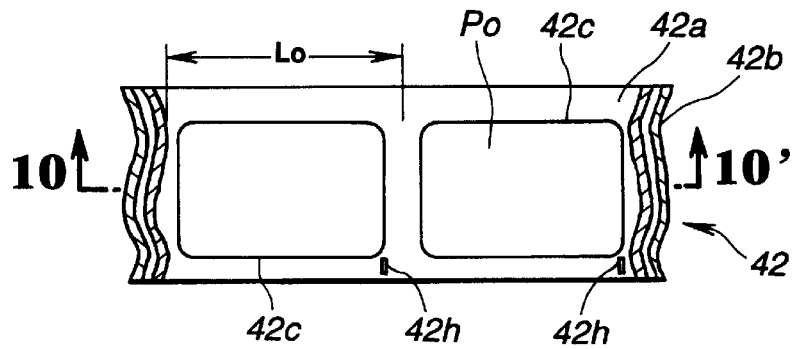
FIG. 9 is an unfolded view of a normal size printing recording tape which is accommodated in the tape cassette of the printer incorporated type electronic camera in FIG. 1.
Figure 10:
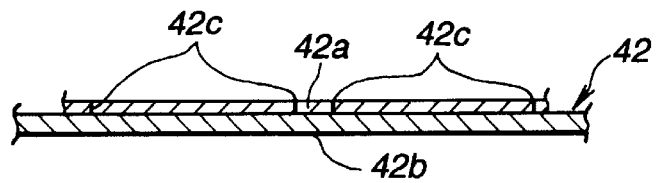
FIG. 10 is a sectional view taken along the line 10—10' of FIG. 9.

FIG. 9 is an unfolded view showing a portion of a normal size printing recording tape 42 which will be accommodated in the tape cassette 30 and FIG. 10 is a sectional view taken along the line 10—10' of FIG. 9. The recording tape 42 is a printing sheet to which print is actually effected and composed of a tape-shaped recording paper 42a with an adhesive agent applied to the back surface thereof and a base paper 42b bonded to the back surface of the recording paper 42a. A quadrilateral-frame-shaped cutout 42c which corresponds to one print picture P0 is formed to the recording paper 42a. After print operation is carried out, the portion of the print picture P0 can be exfoliated along the cutout 42c and pasted to a target position. A form such as a background or the like may be previously printed on the recording paper 42a.

Next, the imaging and print operation of the electronic camera 10 of the embodiment arranged as described above will be described with reference to FIG. 11 and FIG. 12 which are sectional views showing how the tape cassette is loaded.

First, when the tape cassette 30 is loaded to the cassette lid 9 in FIG. 2 in a predetermined attitude and the cassette lid 9 is closed, the tape cassette 30 is put into a loaded state and the print head 16, the platen roller 17, the feed roller 18 and like on the camera main body 11 side enter into the tape cassette main body 31 through cassette openings 31h, 31i. The platen roller 17 is caused to be in contact with the print head 16 under pressure through the ink tape 41 and the recording tape 42 in association with the closing motion of the cassette lid 9. At the same time, the feed roller 18 is also caused to be in contact with the roller 19 through the tape. Thereafter, the platen roller 17 and the feed roller 18 are rotated and feed the recording tape 42 to an initial print possible position to thereby finish the automatic loading operation.

Note, although the electronic camera 10 employs such a mechanism as to advance and retreat the platen roller 17 so that it is in contact with the print head 16 through the tape, the print head 16 may be advanced and retreated on the contrary or both of them may be simultaneously advanced and retreated.

Figure 11:
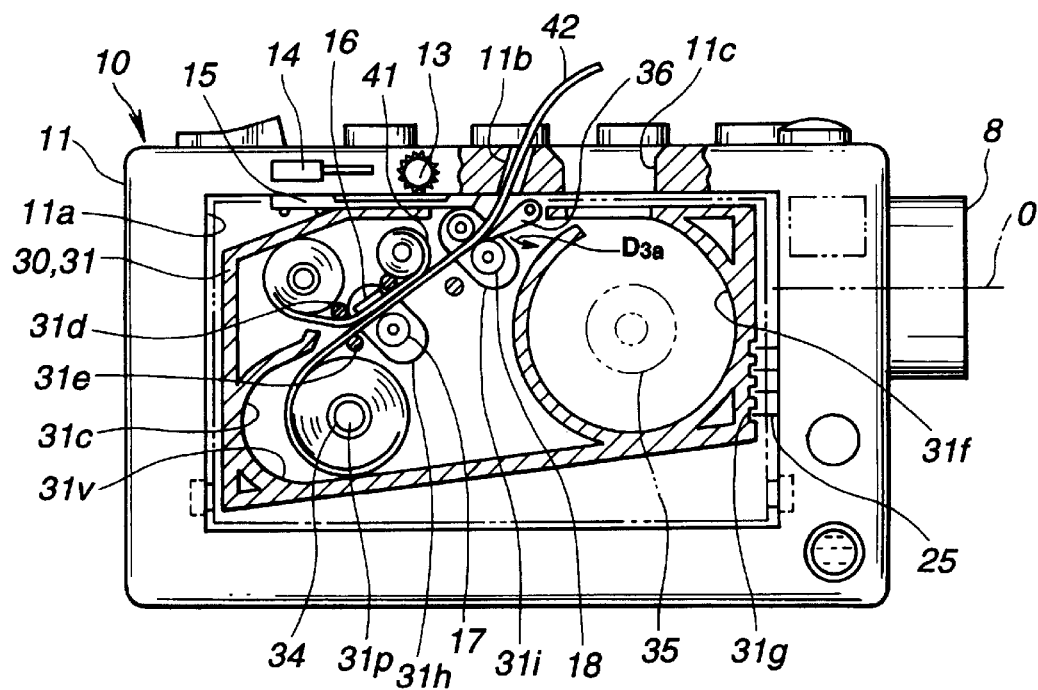
FIG. 11 is a sectional view of the printer incorporated type electronic camera in FIG. 1 in the state that a tape cassette is loaded thereto and a recording tape is discharged to the outside.
Figure 12:
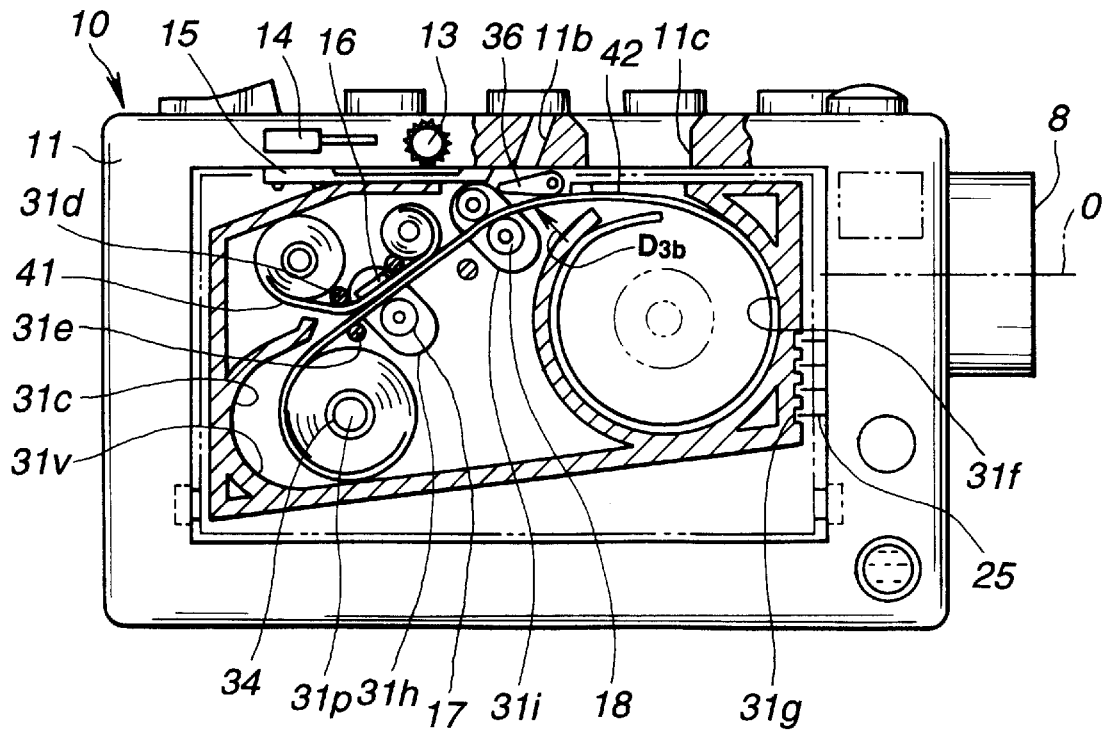
FIG. 12 is a sectional view of the printer incorporated type electronic camera in FIG. 1 in the state that the tape cassette is loaded and the recording tape is accommodated in the accommodating chamber of a main body.

When the printed recording tape 42 having been printed is discharged (introduced) to the outside of the camera main body, it can be fed from the discharge port 11b to the outside by turning the feed changeover plate 36 in a direction D3a by actuating the feed changeover knob 13 as shown in FIG. 11. Further, when the recording tape 42 having been printed is accommodated in the tape cassette main body 31, it can be fed to and accommodated in the accommodating chamber 31f and viewed through the view port 11c by turning the feed changeover plate 36 in a direction D3b by actuating the feed switching knob 13 as shown in FIG. 12.

When the first stage and then the second stage of the two-stage shutter switch SW6 are turned on in the state that the tape cassette 30 is loaded to the camera main body, the image data of the subject is captured to the frame memory 114. Thereafter, when the print start switch SW7 is turned ON, respective pixels are printed by the print head 16 while the ink tape 41 and the recording tape 42 are simultaneously fed.

In a normal size printing process, the print operation is sequentially carried out as to the respective colors of C (cyan), M (magenta) and Y (yellow) for one picture. That is, the ink tape 41 and the recording tape 42 are fed by a length corresponding to the length L0 of the one picture of the normal size (see FIG. 9). Thereafter, the recording tape 42 must be set to the initial state in which the printing of the next color is started by being returned by the length of the one picture it has been fed.

In the above print operation, since the position of a picture to be printed to the position of the cutout 42c is set by the relative position of the recording tape 42 to the print head 16 at the start of the printing of the first color (C), the initial positional accuracy of the recording tape to the first print color corresponds to the accuracy positional displacement of the print picture to the cutout 42c. The accuracy of a color gap is set by the accuracy of the position when the recording tape is returned to a subsequent print color (M or Y). Therefore, the positional accuracy of the returned tape must be set to a particularly pinpoint accuracy.

Since the electronic camera 10 is provided with the reflection type light sensor 27 located above the tape feed mechanism, whether the recording tape 42 has reached the print start position or not and whether it has reached the return position or not are detected by detecting the position of the longitudinal line of the cutout 42c by the reflectance ratio or the color difference of the surface of the recording tape 42 at the start of the print operation.

Note, when the recording paper 42a of the recording tape 42 has a glossy surface, the cutout 42c can be detected from the difference of the reflectance ratio of the recording paper without changing its color from the color of the base paper 42b. When the recording paper has a small reflectance ratio, the longitudinal line of the cutout 42c can be more securely detected by making the base paper 42b of the recording tape 42 black, so that the position of the cutout of the recording paper to which recording is being carried out can be securely detected.

Further, a mark 42h may be previously formed to the recording tape 42 in relation to the print start position to thereby detect the arrival to the above predetermined position by the light sensor 27. In addition, a hole or a cutout passing through the recording paper and the base paper of the recording tape may be used in place of the mark 42h.

When a pulse controlled drive source is used in the positioning of the recording tape to the returned positions thereof for the second color and the third color in relation to the color gap described above, a pinpoint positional accuracy can be maintained by controlling the feed amounts and the return amounts of the pinch roller 17 and the feed roller 18 by a pulse.

Although printing is carried out only when the recording tape is fed only in a feed-out direction in the print operation of the three colors of C, M, Y in the above system, there may be employed a system arranged such that the color C is printed when the tape is fed out, the color M is printed when the tape is returned and the color Y is printed when the tape is fed out again as a modification to the above system.

Although the recording tape must be reciprocatingly moved twice or three times (until a next picture is reset) in the print process of one picture in the print system of the above embodiment, it is necessary only to reciprocatingly move the recording tape once and half or twice (until a next picture is reset) in the print process of the modification, by which a print time can be reduced.

Although the recording tape 42 is returned in the reverse direction after the completion of the print operation of the respective colors as described above, the escape portion 31c is formed to the roll chamber 31v in the tape cassette main body 31 to prevent the reversed fed recording tape 42 from being jammed.

The print operation is not always carried out for each one picture but it may be executed once for several pictures. In this case, after each single color is printed to the recording tape 42, the tape must be returned a distance corresponding to several pictures. Therefore, the escape portion 31c of the cassette main body permits the escape of five pictures as described above.

When panorama size print is carried out using the ink tape 41' shown in FIG. 8, the length of one print picture is twice as long as the above normal size. The ink tape 41' is fed a length 2×L0 for each color and the panorama recording tape is fed an amount corresponding to the length 2×L0. Therefore, each time one of the colors is printed, the panorama recording tape is returned the above length 2×L0 and an escape portion corresponding to the length is needed.

When normal size print is carried out using the panorama size ink tape 41' shown in FIG. 8, first, the portions a1, a2, a3 of the ink tape 41' are used as to the three colors C, M, Y in the print of a first picture. Thereafter, the normal size print is carried out using the portions b1, b2, b3 of the ink tape 41' as to the three colors of C, M, Y in the print of a second picture.

In the state that the recording tape 42 is discharged (introduced) to the outside of the camera, since the recording tape is returned each time the print operation is carried out for each color, there is a possibility that the extreme end of the recording tape 42 is exposed from the camera main body 11 before the recording tape 42 is completely printed. If such a state arises, a printed portion may be made dirty by coming into contact with the hand of the operator.

To cope with this problem, the length of the feed passage of the recording tape 42 from the print head 16 to the discharge port 11b is set longer than the feed amount of the tape when the print operation is carried out once in the electronic camera 10 to prevent the recording tape 42 from being exposed from the camera main body 11 before the print thereto is finished to thereby avoid the occurrence of the above dirty portion. When two or more pictures are printed at the same time, the recording tape may be retreated into the accommodating chamber 31f.

In the state that the recording tape 42 is discharged to the outside of the camera, the printed recording tape 42 can be cut by sliding the cutter blade 15 by actuating the cutting operation knob 14. The position where the recording tape 42 is cut can be finely adjusted by rotating the feed roller 18.

On the other hand, in the state that the recording tape 42 is accommodated in the tape cassette 30, a printed state can be observed through the view port 11c before the recording tape 42 is accommodated therein. The position where the observation is carried out can be finely adjusted by rotating the platen roller 17 and the feed roller 18. After the recording tape 42 passes through the view port 11c, it is accommodated in the accommodating chamber 31f in the curled state.

Figure 13:
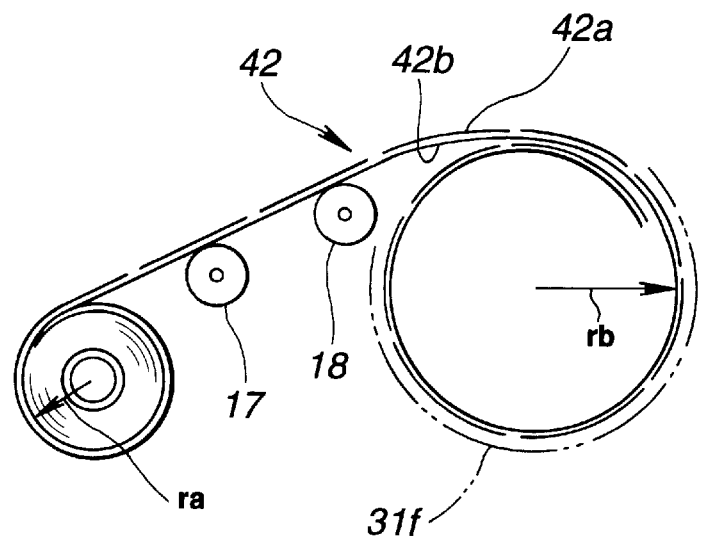
FIG. 13 is a view of a portion of the printer incorporated type electronic camera in FIG. 1 showing the state of the recording tape being fed in the camera.

FIG. 13 is a view showing the state that the recording tape 42 is fed and accommodated. As shown in FIG. 13, before the recording tape 42 is printed, it is held by being wound to a roll shape having a radius of curvature ra or more with the side of the recording paper 42a to which the cutout 42c is formed disposed to the outside. The radius of curvature of the recording tape 42 being printed is smaller than the radius of curvature of the feed passage formed by the feed platen roller 17, the feed roller 18 and the like as well as the having been printed and curled taped in the accommodating chamber 31f is also smaller than that of the recording tape 42 held in the wound state. For example, the radius of curvature of the recording tape 42 in the curled state is set to rb, which is larger than the radius of curvature ra.

As described above, the recording tape 42 is wound and held in the roll-state with its recording paper 42a facing to the outside before print is executed thereto. While the recording tape 42 is being fed or it is accommodated after the print is executed thereto, however, the radius of curvature of the tape is made larger than that in the above wound and held state of the tape to thereby prevent the recording paper 42a from being exfoliated from the base paper 42b at the portion of the cutout 42c(see FIG. 9).

When a recording tape without the cutout is used, since no exfoliation arises, the difference of the radii of curvature as described above need not be always taken into consideration and the recording tape may be wound with its recording paper side facing to the inside in a roll state. In this case, since the recording paper faces to the inside, it is difficult to be made dirty, whereby poor printing can be prevented.

Figure 14:
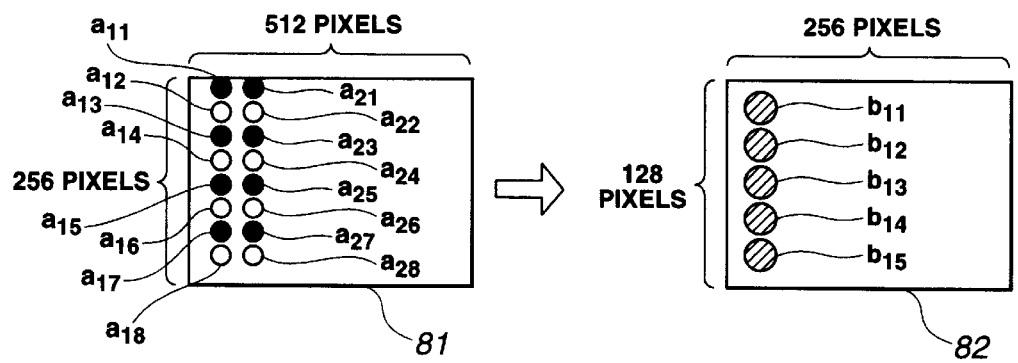
FIG. 14 is a view showing the contrasting relationship between the pixel data of an imaged picture and the pixel data of a print picture when print is executed in a normal size in the printer incorporated type electronic camera in FIG. 1.

Next, operation for converting pixel data in the print processing in the electronic camera 10 of the embodiment will be described. The number of pixels of the imaged picture 81 of the subject as original image data which has been captured by the CCD 109 and stored in the frame memory 114 is 256 pixels in a longitudinal direction ×256 pixels in a lateral direction per picture as shown in the pixel data view of FIG. 14. On the other hand, the number of pixels of an image picture 82 printed by the print head 16 in a normal print state is 128 pixels in the longitudinal direction ×256 pixels in the lateral direction per a picture because the recording tape 42 has a relatively narrow width.

Therefore, an averaging operation is performed on executed to 4 pixels in the longitudinal direction and the lateral direction of the original image data by the CPU 101 and the data of the averaged value is printed as pixel data for one pixel. In the case shown in FIG. 14, the data of the average value of 4 pixels a11, a12, a21, a22 on an original image picture, for example, is printed as a pixel b11 on a print picture. Although thinning-out processing may be used in place of the averaging processing, moire may be caused in this case. To suppress the occurrence of the moire, an optical filter which permits a frequency component having a band width half an ordinary band width to pass therethrough may be used.

Figure 15:
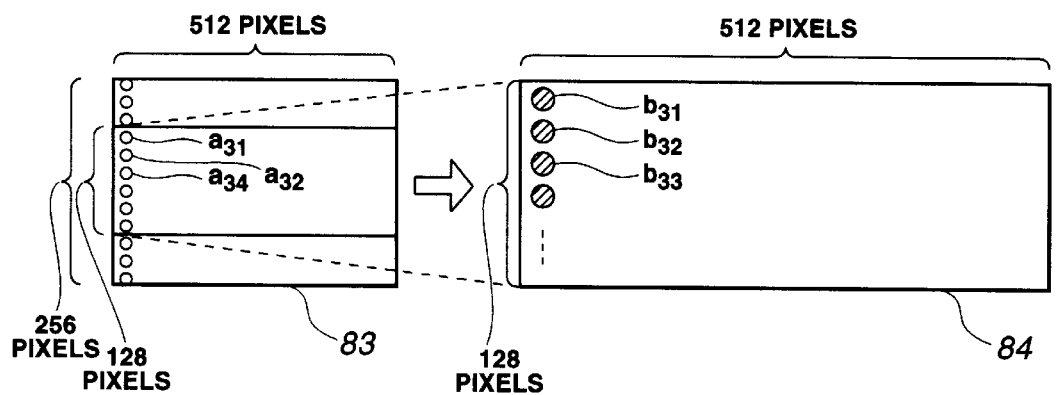
FIG. 15 is a view showing the contrasting relationship between the pixel data of an imaged picture and the pixel data of a print picture when print is executed in a panorama size in the printer incorporated type electronic camera in FIG. 1.

A shown in the pixel data view of FIG. 15, when print is carried out in a panorama size, a panorama picture 84 which has a length twice that of a normal size is printed using the 128 pixels at the center in the longitudinal direction of an imaged picture 83 and the entire 512pixels in the lateral direction thereof. Therefore, the image data of the pixels a31, a32, a33 . . . on the imaged picture 83 is not averaged and printed as it is. However, when the panorama size in a lengthwise direction is less than twice (512 pixels) the normal size, the averaging processing is needed.

Figure 16:
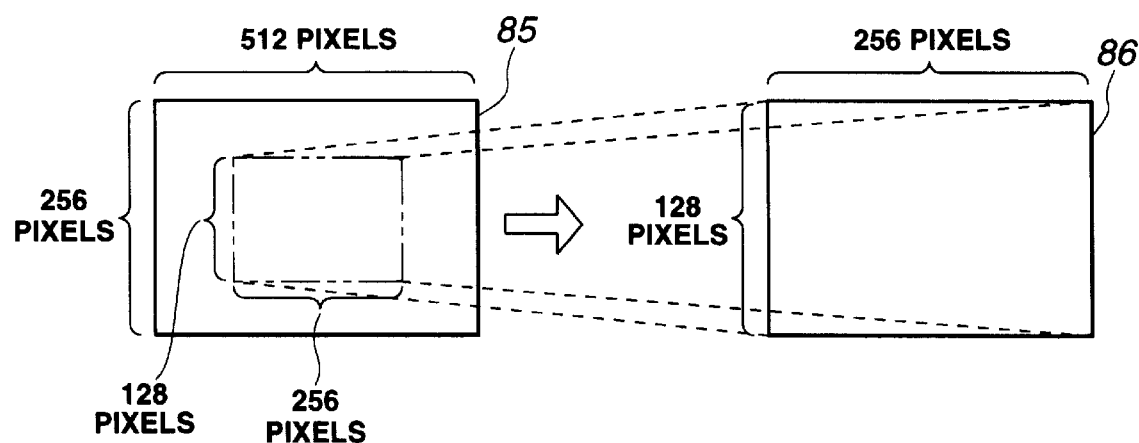
FIG. 16 is a view showing the contrasting relationship between the pixel data of an imaged picture and the pixel data of a print picture when a zoomed picture is printed in the printer incorporated type electronic camera in FIG. 1.

As shown in the pixel data view of FIG. 16, when a zoom picture is printed on a print picture 86 using the 128 pixels at the center in the longitudinal direction of an imaged picture 85 and the 256 pixels at the center in the lateral direction thereof, the image data is printed as it is without being subjected to the averaging processing. However, when a zooming ratio is different from the above case, the printing must be carried out after the execution of the averaging processing.

According to the printer incorporated type electronic camera 10 of the embodiment described above, since the simply arranged color printer unit is incorporated into the electronic camera including the imaging unit using the CCD and the tape cassette 30 is arranged to be easily loaded and unloaded, a color picture can be directly printed out without the need of the processing for capturing imaged data and obtaining a print picture by transferring the imaged data which is conventionally required, whereby a print picture can be simply obtained in an imaging field by the miniaturized and less expensive electronic camera.

Since the recording paper tape which is bonded to the base paper so as to be exfoliated therefrom is used as the recording tape, after print is carried out, the recording paper can be exfoliated from the base paper and pasted to a target place, which is useful as a printer.

Further, when the tape cassette 30 is loaded to the electronic camera, since the information inherent to the tape cassette, that is, the information such as the type of the accommodated recording tape, the number of recordable pictures and the like are captured to the electronic camera, the operator need not input the above information.

Next, modifications and the like of the printer unit, the recording tape and the tape cassette of the printer incorporated type electronic camera 10 described above will be described.

Figure 17:
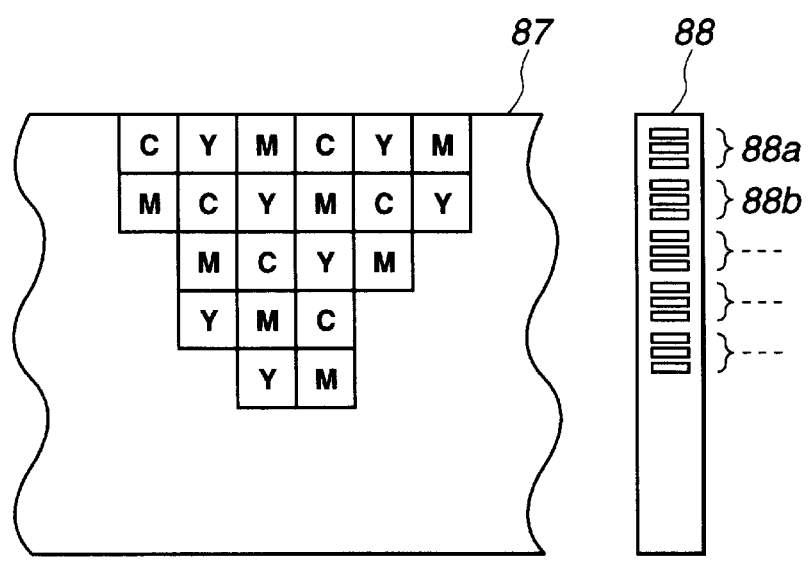
FIG. 17 is an enlarged view of the print pixels of a recording tape and a print head in a modification of a print unit capable of executing one path print in the printer incorporated type electronic camera in FIG. 1.

In the print process executed by the print unit of the electronic camera 10 of the above embodiment, the recording paper 42a must be reciprocatingly moved three times for printing C, M, Y to a picture. Whereas, described here is a print unit capable of making color print by feeding a recording tape only once. That is, the printer unit of a modified print system to which a print head 88 and a matrix ink tape 87 shown in FIG. 17 will be described.

Specifically, head units 88a, 88b, . . . of three colors C, M, Y which correspond to pixels are assembled to the print head 88. Dots of the three colors C, M, Y are disposed to the ink tape 87 per a pixel in a matrix fashion in correspondence to the disposition of color filters. It is assumed that a dot has a size corresponding to the size of the unit of the print head 88.

Color print can be executed by scanning the ink tape 87 by the print head 88 once. In the print, however, the relative position of the ink tape 87 to the print head 88 must be determined with the pitch accuracy of the dots of the above three colors.

To satisfy the above requirement, the ink tape 87 is fed in a feed direction by an ink tape feed roller, whereas when the ink tape 87 displaced in a direction perpendicular to the above feed direction, a signal applied to the print head 88 is shifted to thereby correct the displacement by changing a head element to be selected.

The displacement of the ink tape 87 is detected by detecting the edge of the ink tape 87. Otherwise, the displacement is detected by detecting the ink tape 87 by a permeable or reflective color detecting sensor.

Figure 18:
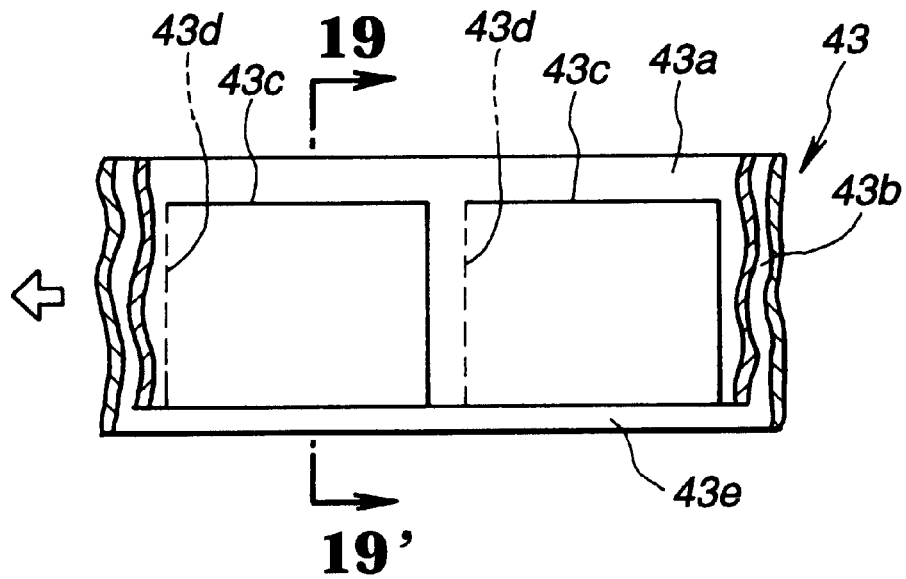
FIG. 18 is a view showing a modification of the recording tape applicable to the printer incorporated type electronic camera in FIG. 1.
Figure 19:
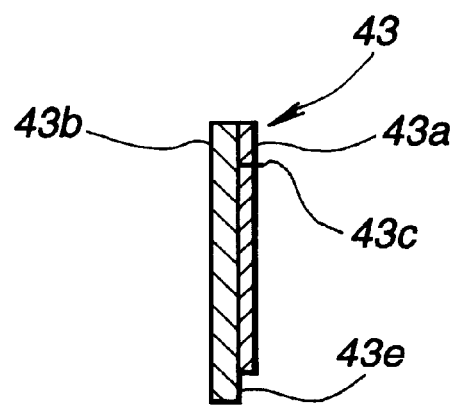
FIG. 19. is a sectional view taken along the line 19—19' in FIG. 18.

The recording tape 43 shown in FIG. 18 may be applied as another modification of the above recording tape 42. The recording tape 43 of the modification has perforated lines 43d as the cutout portion in a width direction and also includes reverse-L-shaped cutouts 43c. As shown in FIG. 19 which is a sectional view taken along the line 19—19' of FIG. 18, a recording paper 43a is made narrower than a base paper 43b at a lower end edge 43e along the feed direction, so that the base paper 43b is exposed. The employment of the above configuration can prevent the exfoliation of the recording paper 43a while it is fed and further permit the recording paper to be easily exfoliated after printing is carried out.

Figure 20:
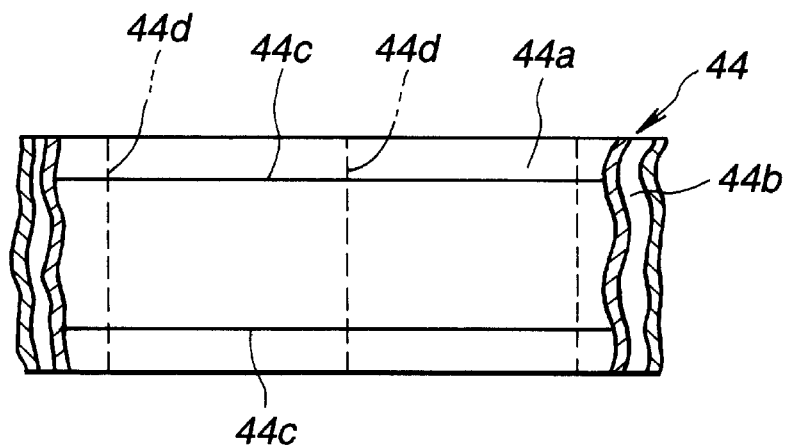
FIG. 20 is a view showing another modification of the recording tape applicable to the printer incorporated type electronic camera in FIG. 1.

The recording tape 44 shown in FIG. 20 may be applied as still another modification of the recording tape 42. Cutouts 44c are formed along only a feed direction. Perforated lines 44d are formed in a width direction. The recording tape 44 can also prevent the exfoliation of a recording paper 44a while it is fed and permit the recording paper 44a to be easily exfoliated along the cutouts 44c. The perforated line 44d in the width direction is not always necessary. Note, numeral 44b denotes a base paper.

Figure 21:
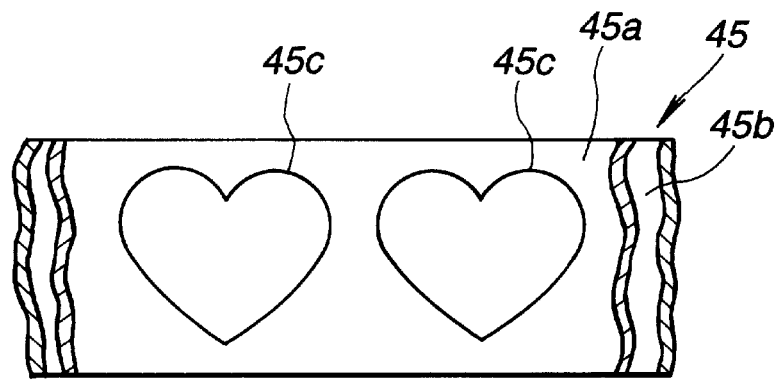
FIG. 21 is a view showing still another modification of the recording tape applicable to the printer incorporated type electronic camera in FIG. 1.

The recording tape 45 shown in FIG. 21 may be applied as a further modification to the recording tape 42. The recording tape 45 is arranged such that the frame of the cutout 45c of recording paper 45a is formed to a special shape such as, for example, a heart shape. Note, numeral 45b denotes a base paper.

Figure 22:
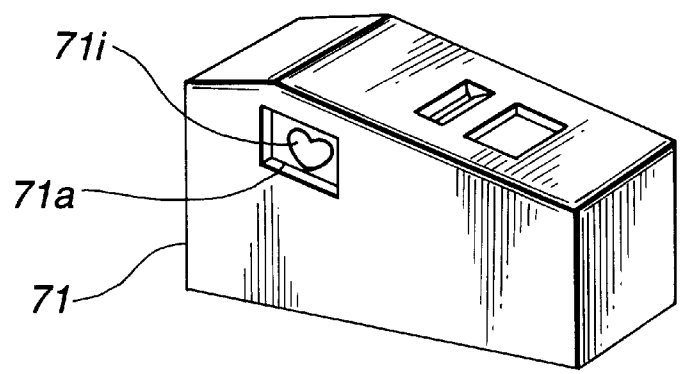
FIG. 22 is a perspective view showing the state that the recording tape in FIG. 21 is applied to a modification of the tape cassette applicable to the printer incorporated type electronic camera in FIG. 1.

FIG. 22 is a perspective view of a tape cassette 71 in which the recording tape 45 is accommodated. This is an example showing that the cutout shape 71i of the recording tape is displayed through the window 71a of the tape cassette 71. The shape of the cutout of the recording tape can be found by the display.

Figure 23:
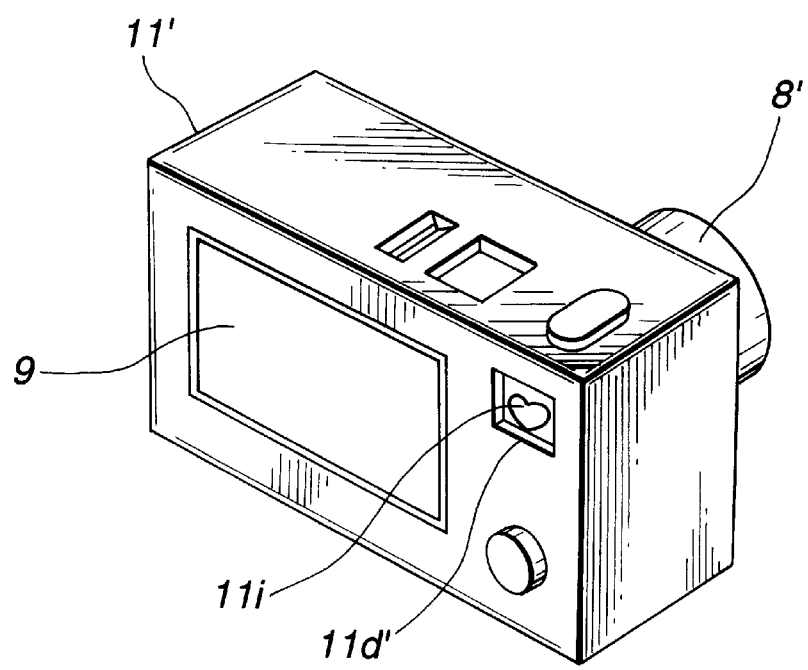
FIG. 23 is a perspective view showing the state that the recording tape in FIG. 21 is applied to a printer incorporated type electronic camera as a modification of the printer incorporated type electronic camera in FIG. 1.

FIG. 23 is a perspective view of a printer incorporated type electronic camera to which the recording tape 45 is applied. In the electronic camera, the cutout frame shape 11i of the recording tape 45 is displayed through the finder 11d' of a camera main body 11'. Note, numeral 8' denotes an imaging lens.

According to the electronic camera, imaging can be carried out while observing how a subject image is settled in the cutout frame. It is preferable that the cutout frame shape 11i is formed to a shape specific to respective cassettes by replacing the cassettes. For this purpose, the cutout frame display 71i of the window 71a of the cassette may be used.

Figure 24:
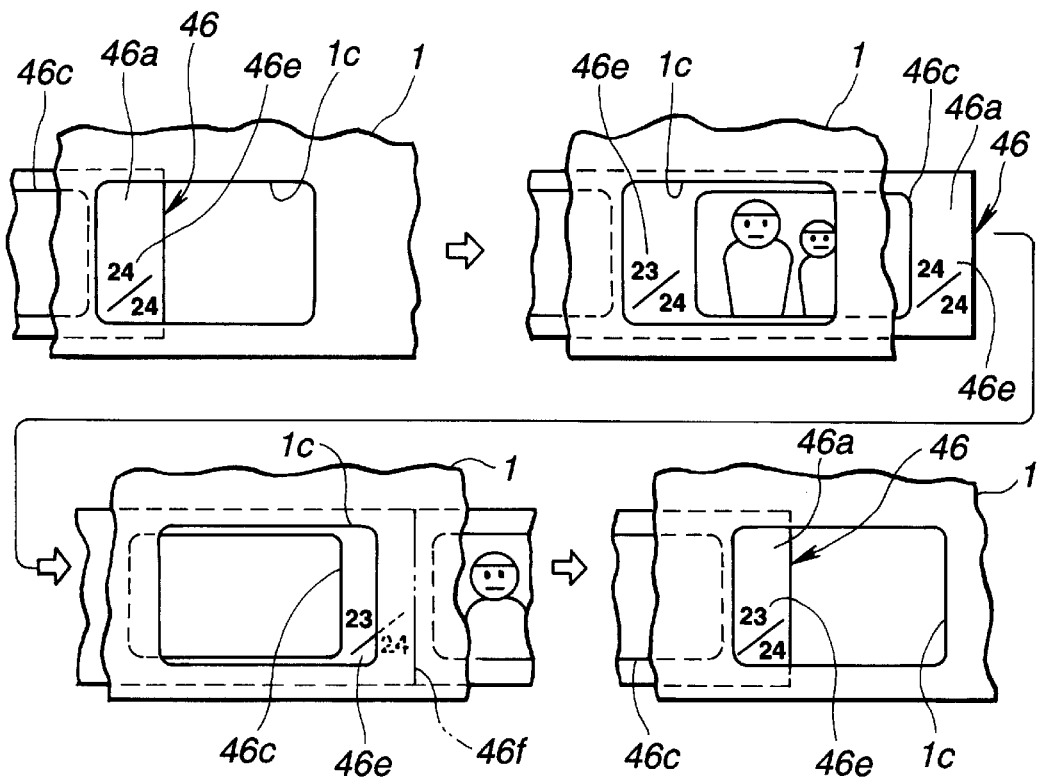
FIG. 24 is an operation sequence flowchart showing the state that the recording tape is observed through the view port of a printer incorporated type electronic camera to which a modification of the print unit of the printer incorporated type electronic camera in FIG. 1 is applied.

Next, a modification of the printer unit capable of displaying a remaining amount, in which the remaining recordable number of a recording tape is printed to a blank space outside of the cutout frame of the tape will be described. FIG. 24 is a development flowchart showing a sequence of how a recording tape 46 is fed in the printer unit of the modification when the tape is observed through a view port 1c. This example shows the case that the recording tape 46 capable of recording 24 prints is loaded. The information as to the initial recordable number is previously recorded to the comb-shaped recesses 31g of the cassette main body 31 as the information as to the number of images which can be recorded to the accommodated recording tape.

On the completion of initial loading of the recording tape 46, "24/24", which indicates that the recording tape 46 to which 24 pictures can be recorded is accommodated, is printed to the blank space outside of the cutout 46c of recording tape 46 at the extreme end thereof by remaining amount display means in the print unit of the modification. The portion where it is displayed can be confirmed through the view hole 1c.

The print of "24/24" may be made before the cassette is shipped, by which the printable number can be confirmed through the view hole of the cassette, even if the cassette is not loaded to the camera.

Subsequently, after a first picture is printed, subtraction processing is carried out by the CPU 101 to thereby print "23/24" which indicates a remaining recordable number at the time between cutout frames and the recording tape 46 is cut once along a cut line 46f. That is, the image in the 24/24 frame and the characters "23/24" are printed in the same print process. Note, it is assumed that a cutter is provided with the electronic camera to which the print unit of the modification is applied at a position on the side of the view hole 1c.

After the recording tape 46 is cut off, the recording tape is returned to a second picture printable position and the above remaining amount "23/24" is displayed to the view hole 1c. Thereafter, the above processing is repeated each time print is carried out.

According to the printer unit of the above modification, the information of the total printable number of the recording tape 46 which is previously recorded to the tape cassette is captured to the CPU 101 and each time print is carried out, the remaining amount of the recording tape remaining in the tape cassette is printed on recording paper as a recordable number which can be confirmed through the view hole 1c. In this case, it is not necessary to previously print remaining recordable numbers to the recording tape. However, the remaining recordable numbers may be printed to the blank spaces outside of the cutouts of the recording tape.

Figure 25:
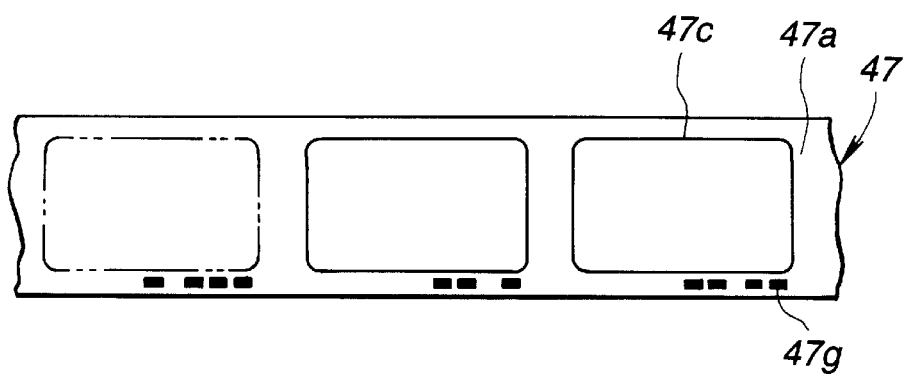
FIG. 25 is an unfolded view of a recording tape applicable to the modification of the print unit of the printer incorporated type electronic camera in FIG. 1

Next, a modification of the print unit will be described which is arranged such that a remaining amount is displayed by reading a coded pattern as a remaining print number code information which is previously printed on a recording tape. FIG. 25 is an unfolded view of a recording tape 47 with a remaining recordable number code 47g which can be applied to the modification of the printer unit.

The recording tape 47 is arranged such that 5-bit remaining recordable number codes 47g as the coded pattern are previously printed to a lower side portion outside of the cutouts 47c on recording paper 47a of the recording tape 47. At the start of print of each picture, when the code 47g is read by a reflective optical sensor, the CPU 101 confirms the number of the recording paper remaining at the time from the code information and the remaining number is displayed to an LCD display unit 128 (see FIG. 45) provided separately.

According to the printer unit of the modification, since the remaining recordable number is displayed to the LCD display unit 128, how the recording tape is used can be easily recognized. Since the codes 47g can be printed in a small space on the recording tape 47, the size of the recording tape 47 can be reduced. Further, even if the recording tape cassette is removed from the camera once and reloaded, an accurate remaining number can be recognized by reading the code pattern 47g.

Figure 26:
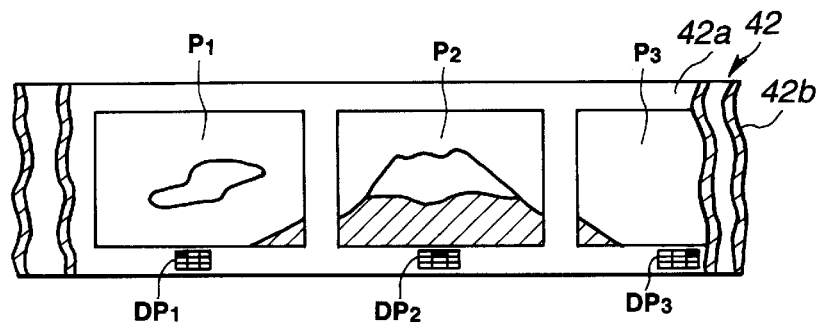
FIG. 26 is an unfolded view of a recording tape printed by the modification of the print unit of the printer incorporated type electronic camera in FIG. 1.
Figure 27:
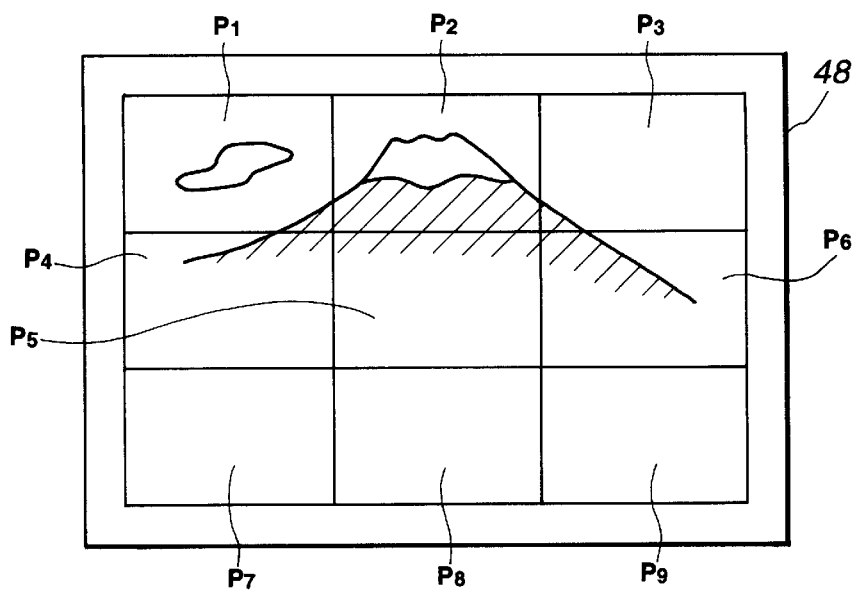
FIG. 27 is a view showing a large picture made by exfoliating and pasting the printed record papers of a recording tape in FIG. 26.

Next, a modification of the printer unit capable of creating a large print picture by combining images printed to a recording tape will be described. FIG. 26 shows the recording tape 42 in which a portion of a series of print pictures, which are printed by the printer unit of the modification to create a large picture, are unfolded and FIG. 27 shows a large picture 48 created by combining the series of the print pictures.

As shown in FIG. 26, the printer unit of the modification prints divided pictures P1, P2, P3 . . . and the like on the recording paper 42a of the recording tape 42. The picture 48 having a large image can be obtained by pasting the divided pictures P1–P9 on a large base paper 48 as shown in FIG. 27.

FIG. 26 is a view schematically showing position information indicating the positions of the divided pictures P1, P2, P3 . . . on the entire picture and the information DP1, DP2, DP3, . . . may be printed to the outside of the frame in the entire picture. With this arrangement, since positions where the divided pictures are pasted can be found, a mistake of pasting them at false positions can be avoided.

Figure 28:
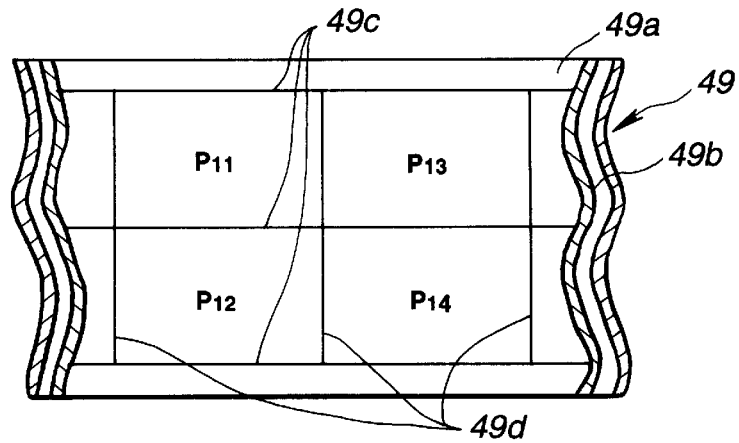
FIG. 28 is an unfolded view of a recording tape which is applicable to the modification of the print unit of the printer incorporated type electronic camera in FIG. 1 and which can make a multiple picture print.

Next, a modification of the printer unit capable of obtaining a large print picture by multiple pictures by the application of a wide recording tape will be described. FIG. 28 shows a recording tape 49 to which printed is executed by the printer unit of the modification. In FIG. 28, numeral 49a denotes a recording paper and numeral 49b denotes a base paper.

The recording paper 49a of the recording tape 49 has cutouts 49c for dividing it into two pictures each having a width of a normal size in a width direction and cutouts 49d for dividing it into a width of a normal size in a feed direction.

The image data of a subject image is divided into four multiple pictures P11, P12, P13 and P14 by the CPU 101. As shown in FIG. 28, the multiple pictures are printed in the frames formed by the grid-shaped cutouts 49c, 49d on the recording paper 49a.

As described above, according to the printer unit of the modification, a large picture can be printed on the recording tape.

Next, a modification of a printer unit capable of recording various types of information composed of dot codes to the blank space on recording paper after an ordinary picture is printed to the recording tape or to the recording tape subsequent to the printed picture will be described.

In the printer unit of the modification, the dot code which is printed subsequent to the ordinary print is, for example, a dot code printed to a multimedia paper (MMP) card. That is, in this case, image data, audio data, ordinary digital data and the like are coded according to a predetermined format and recorded by being printed as a dot pattern. This recorded code information is capable of being optically read out different from conventional magnetic record and photomagnetic record.

Note, a technology for recording and reproducing the dot code information is described in detail in Japanese Unexamined Patent Publication No. 6-231466 titled "Dot Code and Information Recording and Reproducing System for Recording and Reproducing It" which is incorporated herein by reference.

For example, when the entire imaged data of an imaged picture having been captured to the CCD 109 is converted into the dot code and printed to the recording tape 42 without being subjected to the averaging processing or the like, it is possible to restore an imaged picture of high resolution by separately reading the dot code on the recording tape 42 by a dot code reproducing device.

Further, it is also possible to reproduce voice and the like by simultaneously converting audio data, imaging data and the like into the dot code in imaging and reproducing them.

Figure 29:
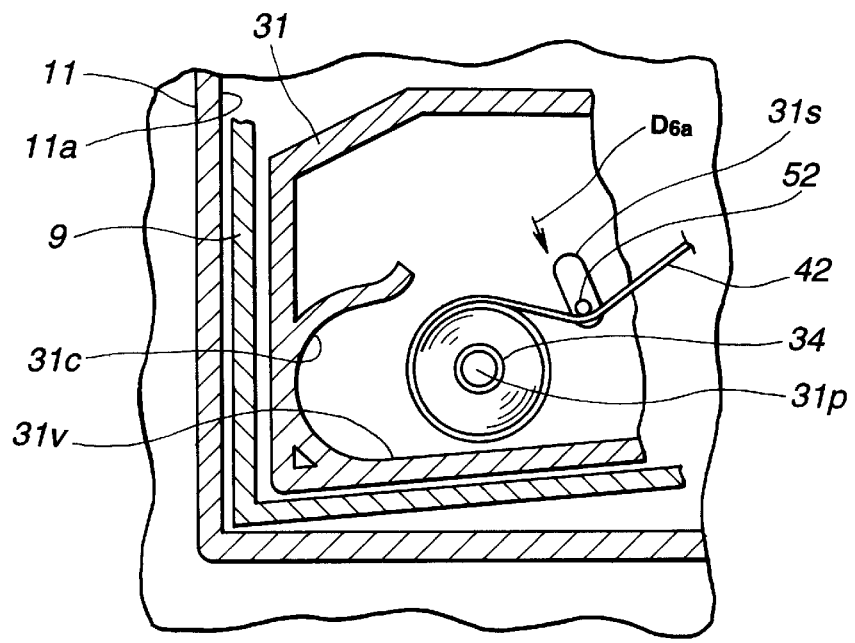
FIG. 29 is a sectional view showing an operating state of a modification of a recording tape remaining amount sensing unit of the printer incorporated type electronic camera in FIG. 1 in which a tape remains in a large amount.
Figure 30:
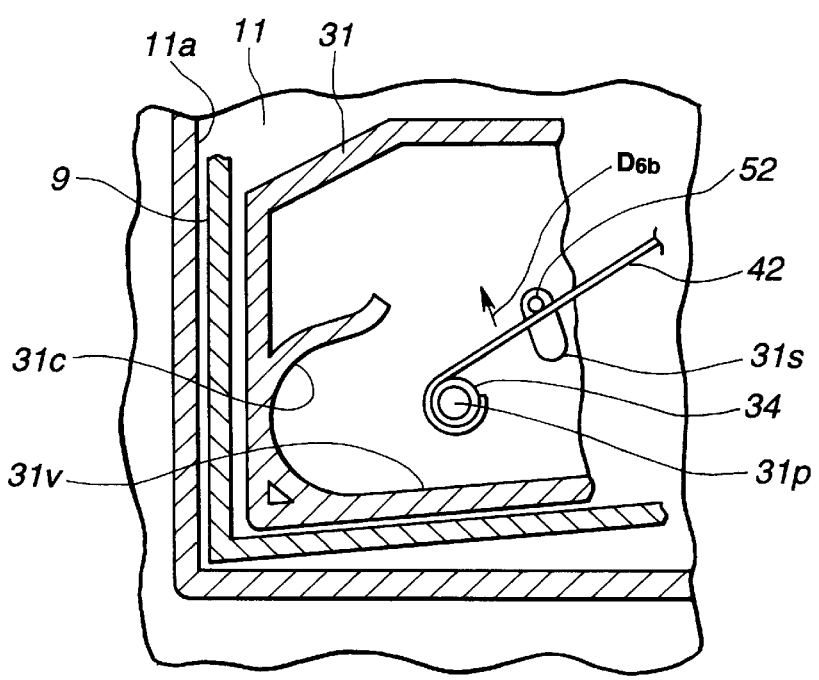
FIG. 30 is a sectional view showing an operating state of the modification of the recording tape remaining amount sensing unit in FIG. 29 in which the tape is substantially depleted.

Next, a modification of the detecting mechanism for detecting the remaining amount of the recording tape of a tape cassette having been loaded will be described. FIG. 29 and FIG. 30 are views showing how the recording tape remaining amount detecting mechanism of the modification operates, in which FIG. 29 shows the state of the recording tape 42 whose terminal end is not yet reached, whereas FIG. 30 shows the state that the terminal end of the recording tape is reached.

When the tape cassette 30 is loaded to the camera in the remaining amount detecting mechanism, the actuator 52 of a detecting switch provided with the camera main body is introduced into the tape cassette main body 31 through a slot-shaped inserting hole 31s as a mechanism to be detected which is provided with the tape cassette main body 31 and positioned on a feed passage between the print head 16 of the recording tape 42 and the recording tape roll. An urging force which overcomes the tension of the recording tape 42 being fed and displaces the recording tape 42 in a direction D6a is acted on the actuator 52.

Therefore, in the state that the recording tape 42 remains around the recording tape roll, the actuator 52 is lowered in a direction D6a as shown in FIG. 29. When print is carried out to the recording tape as much as possible and the tape end is reached, since an end of the recording tape is secured to the cylindrical core member 34, the recording tape 42 is stretched as shown in FIG. 30, whereby the actuator 52 is raised in a direction D6b and the switch is changed from an OFF state to an ON state. The CPU 101 determines that the recording tape 42 has been exhausted in response to the ON signal from the switch. Then, the CPU 101 prohibits print operation, image data forming operation and the like and makes notification and the like.

As described above, according to the remaining amount detecting mechanism of the modification, the detecting mechanism itself is simple in structure and occupies a small space as well as it securely executes detection and is less expensive in cost.

Figure 31:
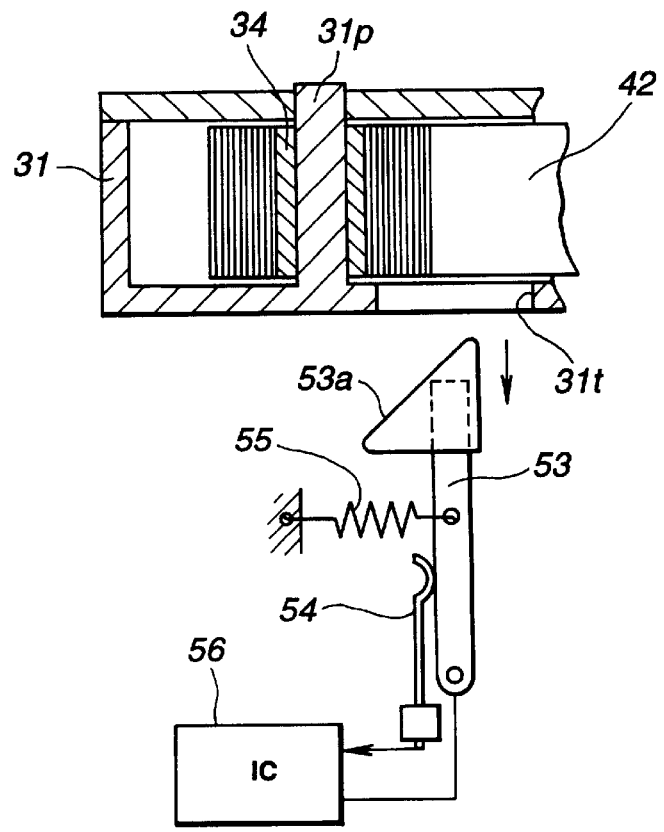
FIG. 31 is a view showing another modification of the recording tape remaining amount sensing unit of the printer incorporated type electronic camera in FIG. 1 before a tape cassette is inserted.
Figure 32:
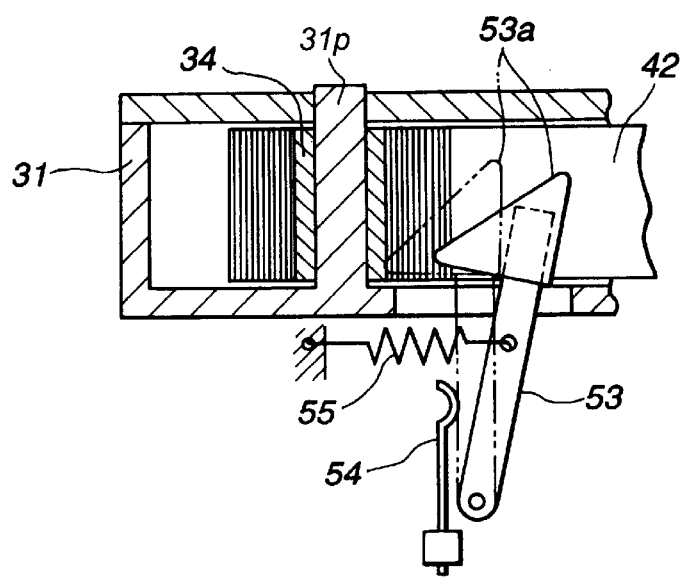
FIG. 32 is a view showing the recording tape remaining amount sensing unit in FIG. 31 after the tape cassette is inserted.

FIG. 31 is a view showing the state of another modification of the recording tape remaining amount detecting mechanism before the cassette is loaded.

The remaining amount detecting mechanism is composed of a detecting switch contact piece 54, a metal actuator 53 having an inclined surface member 53a, an urging spring 55 and an input IC 56 for detecting how the contact piece comes into contact with the actuator each disposed to the camera main body. An inserting hole 31t as a mechanism to be detected is formed to the tape cassette main body 31 of the tape cassette 30.

When the tape cassette 30 is loaded to the camera, the inclined surface member 53a of the actuator 53 is inserted into the tape cassette main body 31 through the inserting hole 31t and the inclined surface member 53a slips on the outside diameter portion of the roll of the recording tape 42 and the extreme end of the inclined surface member 53a is abutted against the outside diameter portion of the roll by the urging force of the urging spring 55.

When the amount of the recording tape 42 remains, the actuator 53 is spaced from the contact piece 54. When the recording tape 42 is consumed and the outside diameter of the roll is made smaller than a predetermined size or the tape is completely exhausted, however, the inclined surface member 53a is abutted against the core member 34 supported by a shaft 31p or the reduced outside diameter of the roll. The actuator 53 comes into contact with the contact piece 54 in this state and an ON signal is input to the input IC 56. The CPU 101 determines that the remaining amount of the recording tape 42 has been made less than a predetermined amount in response to the ON signal from the switch. Then, the CPU 101 prohibits print operation, image data forming operation and the like and makes notification and the like.

As described above, according to the remaining amount detecting mechanism of the modification, the actuator can be easily inserted into the tape cassette, the mechanism is simplified, the remaining amount can be securely detected and a cost is reduced.

Next, a rewinding force transmission mechanism for drawing the recording tape when it is returned to print the respective colors will be described. Although the tape escape portion 31c which is necessary to return the recording tape is formed to the roll chamber 31v of the tape cassette main body 31 in the printer incorporated type electronic camera of the above embodiment, when the rewinding force transmission mechanism is applied, the escape portion 31c becomes unnecessary.

Figure 33:
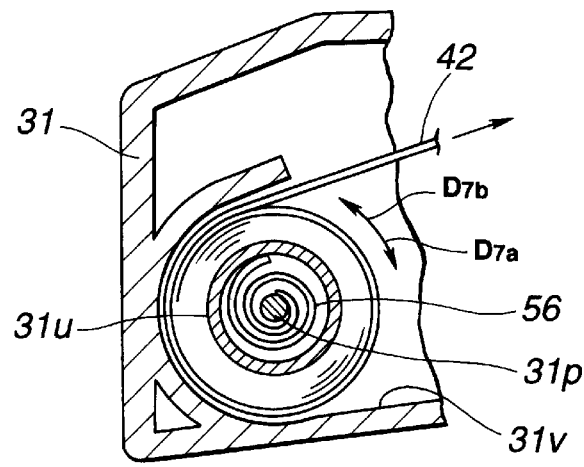
FIG. 33 is a sectional view showing a rewinding force transmission mechanism as a modification in place of the escaping portion of the roll chamber of the recording tape in the printer incorporated type electronic camera in FIG. 1.

That is, as shown in FIG. 33, the rewinding force transmission mechanism is arranged such that an end of a spiral spring 56 whose winding direction coincides with the direction in which the recording tape 42 is wound around the roll is fixed to the shaft 31p disposed in the roll chamber 31v of the tape cassette main body 31, the roll core member 31u of the recording tape 42 is inserted to surround the outside surface of the spiral spring 56 and the inner peripheral surface of the roll core member 31u comes into contact with the outer end portion of the spiral spring 56 in the state that they have a predetermined frictional force.

The frictional force is sufficient to draw and return the recording tape which is in a free state. At the time, the core member 31u is permitted to rotate through the spiral spring 56 in an amount which is sufficient to move the recording tape a distance for a picture or to apply a stroke for the number of pictures to be printed once.

When the first color (C) of the colors C, M, Y is printed to a first picture, the recording tape 42 is drawn apart from the roll by the feed force of the platen roller 17. At the time, the core member 31u also rotates in a direction D7a at the same time and the spiral spring 56 is tightly wound by the action of the frictional force. Next, when the platen roller 17 is reversed by one picture to print the second color (M), the spiral spring 56 is also rewound together with the core member 31u in a direction D7b without slipping at its abutted position, so that the recording tape 42 is returned to its initial state without being almost loosened. Then, the recording tape 42 is fed by the one picture to print the second color. The third color (Y) is printed likewise by returning and feeding the recording tape and the print operation for the one picture is finished.

Next, although the first color is printed when the second picture is printed, since the spiral spring 56 is tightly wound at the time, the portion where it is abutted against the core member 31u slips and the core member 31u is rotated in the direction D7a. Thereafter, the above motion is repeated.

According to the rewinding force transmission mechanism, since the escape portion 31c is not necessary as described above, the size of the tape cassette main body 31 can be reduced and a jam due to the return motion of the recording tape 42 is difficult to be caused. Further, a secure motion can be obtained by the simple mechanism.

Next, modifications of cassette information detecting means for detecting the specification of the accommodated recording tape such as a recordable number and the like and the cassette information holding means thereof will be described.

Figure 34:
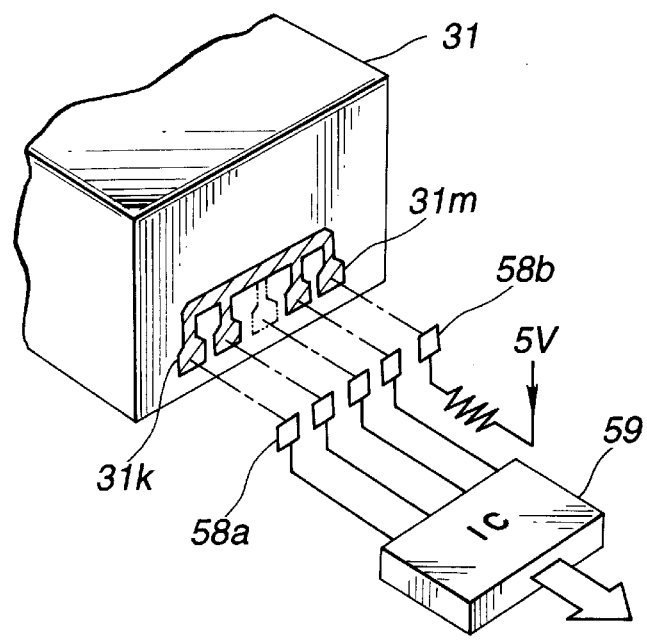
FIG. 34 is a perspective view of modifications of the recording unit and the sensing unit of the printer incorporated type electronic camera in FIG. 1.

As shown in the perspective view of FIG. 34, a cassette information recording unit as the cassette information holding means of the modification is composed of electric conductive patterns 31k, 31m with a particular pattern which are disposed to a side surface of the cassette main body 31. Further, a cassette information detecting unit as the modification of the cassette information detecting means is composed of contact points 58a, 58b which can be in contact with the electric conductive patterns 31k, 31m when the tape cassette main body 31 is loaded to the electronic camera 10 and an input IC 59 to which the contact points are connected. The output from the IC 59 is captured to the CPU 101, cassette information is read by the held information reading means in the CPU 101 and the feed of the ink tape, the recording tape and the like is controlled.

According to the cassette information holding means of the modification, 5-bit tape cassette information can be recorded by five patterns such as the above electric conductive patterns 31k, 31m and the like. Since a recess need not be formed to the main body and an actuator and the like are not necessary to the detecting unit, the size of the tape cassette main body 31 and the camera main body 11 can be reduced. Further, the cassette information holding means has an advantage that no mistake arises in detection because it is not provided with a mechanical detecting unit.

Further, it is also possible to provide a magnetic head in place of the contacts and the electric conductive patterns and dispose a magnetic recording medium to which information is recorded to the tape cassette main body 31.

Next, recording tape use information holding means in the printer incorporated type electronic camera will be described.

The recording tape use information is information as to whether a printable recording tape is accommodated in the tape cassette 30 or not. The information holding means may be arranged such that a plastic claw is disposed to the cassette main body similar to that of a conventional video cassette tape and the claw is broken off when a recording tape accommodated therein has been printed to thereby record tape use information indicating that the recording tape is unusable.

Figure 35:
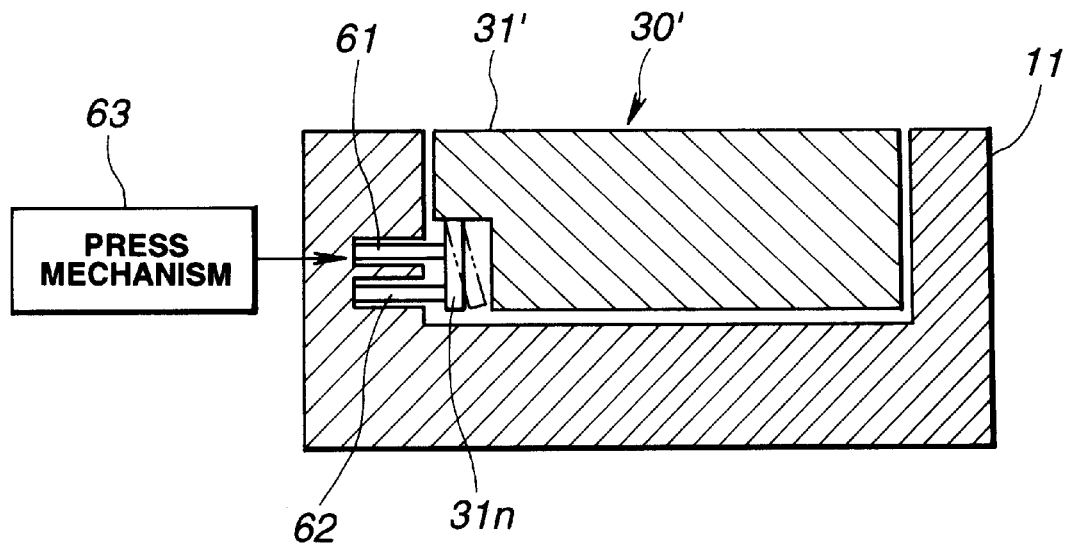
FIG. 35 is a sectional view showing how a tape cassette having a recording tape use information recording unit is loaded to a modification of the camera main body having the above information sensing unit in the printer incorporated type electronic camera in FIG. 1.

As shown in FIG. 35, the metal connection piece 31n of the information recording unit disposed to the tape cassette main body 31' of a tape cassette 30' and the connection pieces 61, 62 of the detecting unit disposed to the camera main body 11 can be proposed as the information recording unit serving as the recording tape use information holding means and as the detecting unit serving as the detecting means thereof of the modifications.

Since the metal connection piece 31n is plastically deformable, when all the recording tape in the cassette is printed, it is pressed and deformed by the press mechanism 63 disposed to the camera main body 11 through the connection piece 61. The press mechanism 63 may be a mechanism which makes use of the tensile strength of the recording tape. In addition, the metal connection piece 31n may be deformed by the operator who actuates the press mechanism 63.

Figure 36:
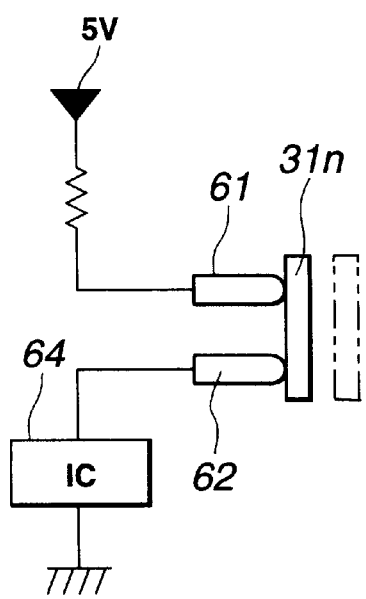
FIG. 36 is a circuit diagram of the sensing unit of the modification of FIG. 35.

When a recording tape which has not been yet printed is accommodated in the tape cassette 30, the metal connection piece 31n remains undeformed. Thus, when the tape cassette 30 is loaded to the camera main body, the connection pieces 61, 62 come into contact with the metal connection piece 31n and an ON signal is input to an input IC 64 as shown in the circuit diagram of FIG. 36 showing a connected state. As a result, the CPU 101 determines that print is possible.

When the recording tape accommodated in the tape cassette 30 is exhausted and no recordable recording tape remains in the tape cassette 30, the metal connection piece 31n is pressed once and deformed. Therefore, even if the tape cassette 30 is loaded to the camera main body, since the metal connection piece 31n retreats as shown in the circuit diagram of the connected state in FIG. 36, the connection pieces 61, 62 are not electrically conducted and no ON signal is input to the input IC 64. As a result, the tape cassette 30 determines that the tape cassette 30 is in a print impossible state.

According to the recording tape use information holding means and the detecting means thereof of the modifications, since the user is not required to particularly carefully break off the claw of the cassette and when a printable recording tape is exhausted in the cassette, the metal piece is automatically bent, it is not caused that print is carelessly carried out using a print impossible cassette.

Note, a magnetic recording/reproducing device may be used as the cassette information recording/holding means and the detecting means in addition to the electrically connected state detecting system to which the metal connection piece 31n, the connection pieces 61, 62 and the like are applied.

Figure 37:
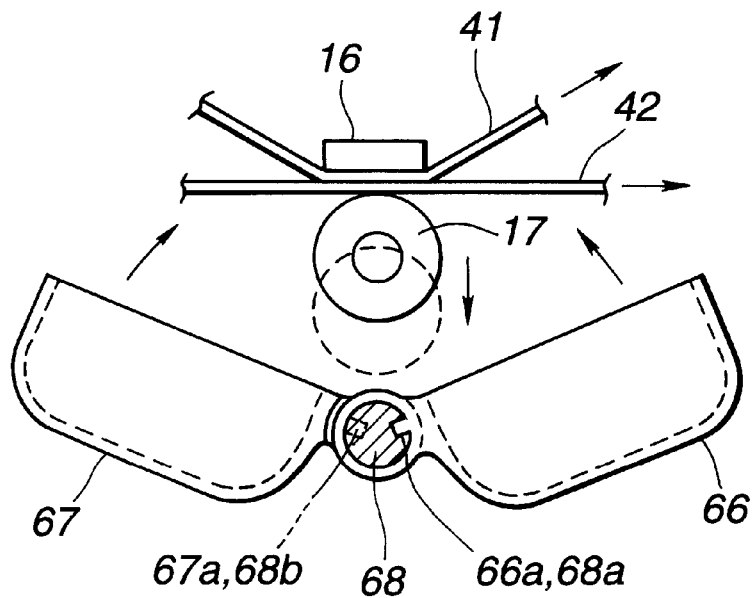
FIG. 37 is a plan view showing the cover opening state of a print head/platen roller protecting cover unit which is applicable to the printer incorporated type electronic camera in FIG. 1.
Figure 38:
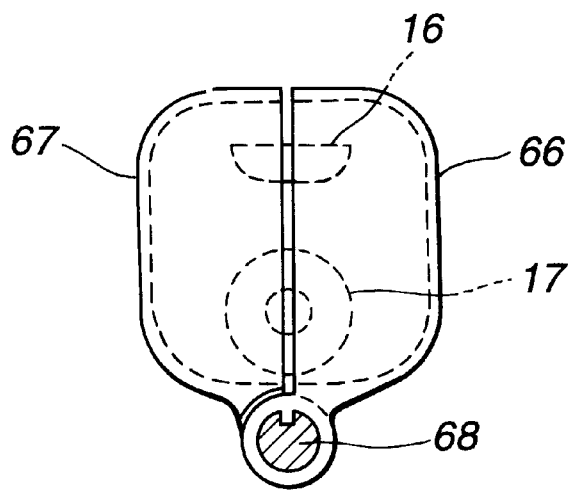
FIG. 38 is a plan view showing the cover closed state of the print head/platen roller protecting cover unit of FIG. 37.
Figure 39:
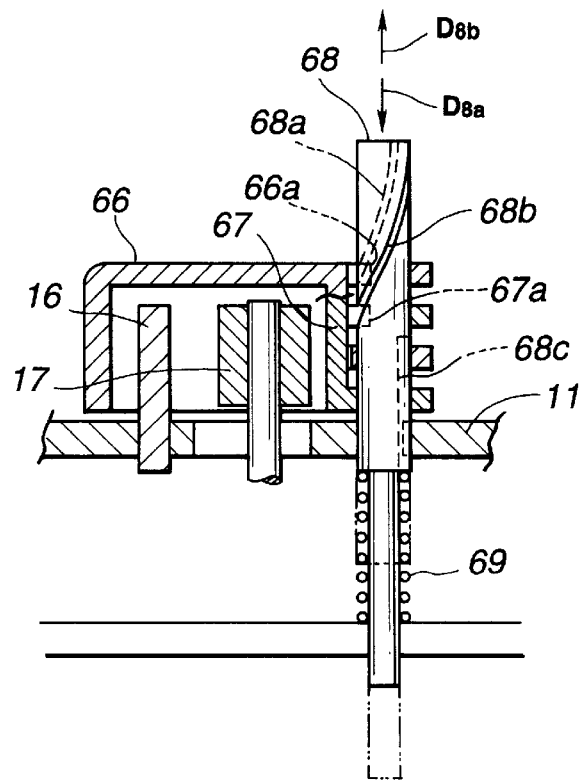
FIG. 39 is a longitudinal sectional view of the print head/platen roller protecting cover unit in FIG. 37.

Next, a print head/platen roller protection cover unit which can be assembled to the printer incorporated type electronic camera will be described. FIG. 37 and FIG. 38 are plan views showing how the print head/platen roller protection cover unit operates, in which FIG. 37 shows a print operation state and FIG. 38 is a protecting state. FIG. 39 is a longitudinal sectional view of the protection cover unit.

The protection cover unit is assembled to the camera main body 11 and composed of a support shaft 68 having a straightly advancing groove 68c and lead grooves 68a, 68b each facing in an opposite direction relative to the other, right and left protection covers 66, 67 which can approximately hermetically close the print head 16 and the platen roller 17 and be turned by being supported by the support shaft 68, and a return spring 69 which urges the support shaft 68 in an axial direction or in a direction D8b.

The projections 66a, 67a of protection covers 66, 67 are slidingly inserted into the lead grooves 68a, 68b of the support shaft 68 which face in the opposite direction relative to one and other other and protection covers 66, 67 can be opened and closed as the support shaft 68 moves in the axial direction.

Opening/closing operation of the protection covers arranged as described above will be described. Before the tape cassette is loaded, the support shaft 68 is returned in the direction D8b and the right and left protection covers 66, 67 are held in a closed state as shown in FIG. 38. When the tape cassette is loaded to the camera main body 11, the support shaft 68 is pressed and moved in the axial direction or in a direction D8a. With the movement, the protection covers 66, 67 are turned in an opening direction by being guided by the lead grooves 68a, 68b of the shaft 68 to thereby expose the print head 16 and the platen roller 17. At the time, the platen roller 17 is pressed against the print head 16 through the ink tape 41 and the recording tape 42 and set to a print possible state.

According to the protection cover unit, since the print head 16 and the platen roller 17 are held in the approximately hermetically closed state when the tape cassette is not loaded and not used, the adhesion of dust thereto can be prevented as well as assuring they are not damaged. Further, the protection covers themselves are simple in construction and not disadvantageous in cost and space.

Figure 40:
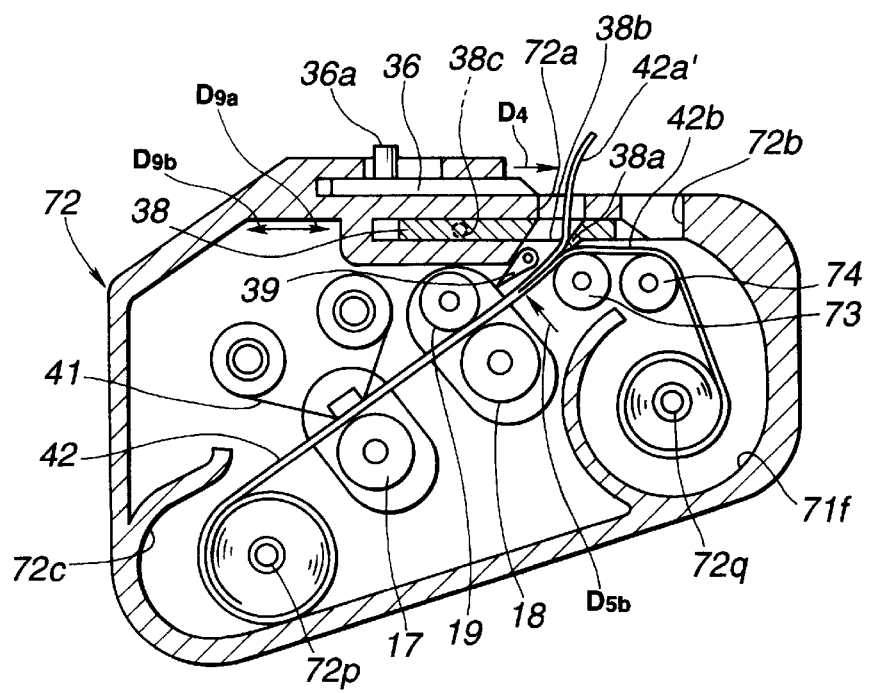
FIG. 40 is a sectional view of a modification of the tape cassette applicable to the printer incorporated type electronic camera in FIG. 1 and shows the state that a recording paper is discharged to the outside after it is exfoliated.
Figure 41:
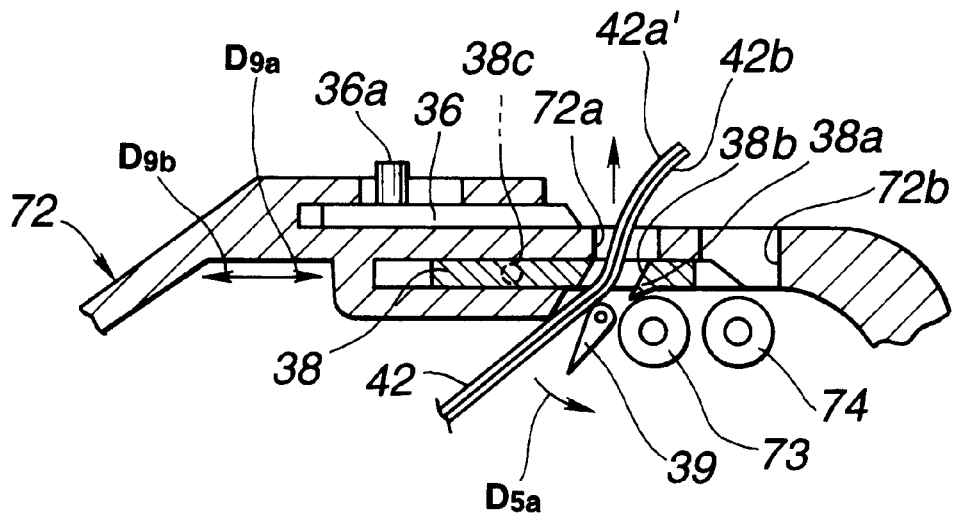
FIG. 41 is a sectional view of a portion in the vicinity of the separating unit of the tape cassette in FIG. 40 when the recording tape is discharged to the outside without being separated.
Figure 42:
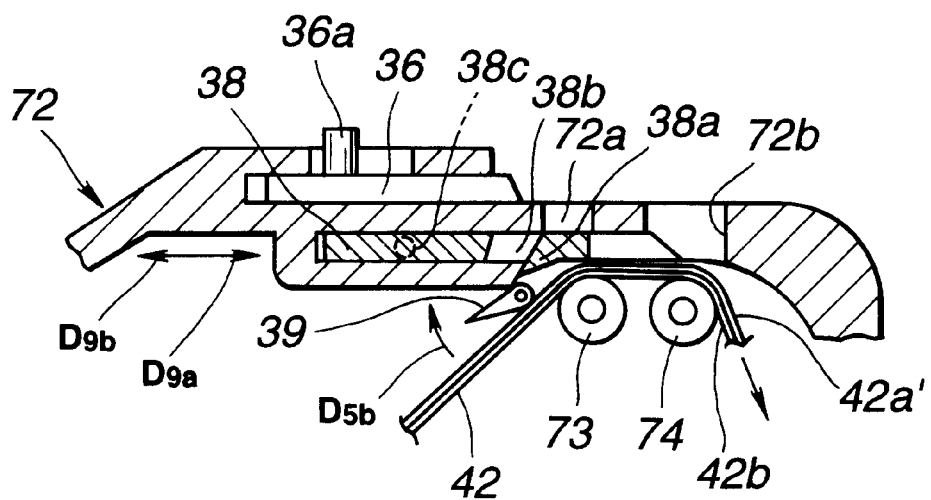
FIG. 42 is a sectional view of the portion in the vicinity of the separating unit of the tape cassette in FIG. 40 when the recording tape is accommodated in the cassette without being separated.

Next, a tape cassette with a cutter/separation mechanism as a modification of the tape cassette as the member to be recorded will be described. FIG. 40 is a sectional view showing that a tape cassette 72 of the modification is separated and discharged. FIG. 41 is a sectional view showing a portion in the vicinity of the separating unit in the state that the tape cassette 72 of the modification is discharged without being separated and FIG. 42 is a sectional view showing the portion in the vicinity of the separating unit in the state that the tape cassette 72 of the modification is accommodated without being separated.

The structure of the feed changeover/discharge and separating portion of the tape cassette 72 of the modification is different from that of the tape cassette 30. That is, the feed changeover/discharge and separating portion includes, in addition to a turnable feed changeover plate 39, a separation plate 38 which can slide to a position above the feed changeover plate 39 and constitutes a second feed mechanism (separation mechanism) including an operation unit 38c, an opening 38b and a separation claw 38a, guide rollers 73, 74 which are positioned rearward of the feed changeover plate 39 and constitute a first feed mechanism, a base paper winding shaft 72q in a tape accommodation chamber 71f below the guide roller 74, the discharge port 72a of the cassette main body, a view port 72b constituting the first feed mechanism and a cutter 36 which is positioned above the discharge port 72a and constitutes a slidable second feed mechanism (cutter mechanism) having an operation unit 36a each disposed thereto.

Note, the structure of the portion in the vicinity of the holes into which the print head 16, the platen roller 17, the feed roller 18 and the like are inserted, the structure of the support shaft 72p and the escape portion 72c in the vicinity of the roll chamber, and the like are the same as the structures of the tape cassette 30. However, a recording paper with the parallel-line-shaped cutouts 44c shown in FIG. 20 or a recording paper without a cutout is applied to the recording paper 42a' of the recording tape 42 in place of a recording paper with the frame-shaped cutouts 42c shown in FIG. 9 when the recording paper is separated from the recording tape.

When the recording paper 42a' of the recording tape 42 having been printed is separated from the base paper 42b and only the recording paper 42a' is discharged in the tape cassette 72 of the modification arranged as described above, the feed changeover plate 39 is turned in a direction D5b to thereby slide the separation plate 38 in a direction D9a through the operation unit 38c. When the recording tape 42 having been printed is fed out by the feed roller 18 in this state, the recording tape 42 is guided toward the claw 38a of the separation plate 38 by the feed changeover plate 39. The recording paper 42a' is exfoliated by the claw 38a and discharged (taken out) through the discharge port 72a. On the other hand, the base paper 42b is guided by the guide rollers 73, 74 and wound around a base paper winding shaft 72q.

When the recording tape 42 having been printed is discharged in the state that the recording paper 42a' is not separated from the base paper 42b, the feed changeover plate 39 is turned in a direction D5a to thereby slide the separation plate 38 in the direction D9a. When the recording tape 42 having been printed is fed out by the feed roller 18, the recording tape 42 is guided toward the discharge port 72a by the feed changeover plate 39 discharged to the outside without being separated.

When the recording tape 42 having been printed is accommodated in the cassette in the state that the recording paper 42a' is not separated from the base paper 42b, the feed changeover plate 39 is turned in the direction D5b to thereby slide the separation plate 38 in a direction D9b. When the recording tape 42 having been printed is fed out by the feed roller 18 in this state, the recording tape 42 is guided toward the guide rollers 73, 74 by the feed changeover plate 39 and accommodated in the accommodating chamber 71f without being separated.

According to the above tape cassette with the cutter/separation mechanism, since the tape cassette is provided with the cutter, a cutter need not be provided with the camera and the recording tape can be cut only by the cassette. Further, since the tape cassette is provided with the separation mechanism, the recording paper 42*a*' can be automatically separated and a troublesome exfoliation job can be omitted. Moreover, the separation mechanism is simple in arrangement and advantageous in cost.

Figure 43:
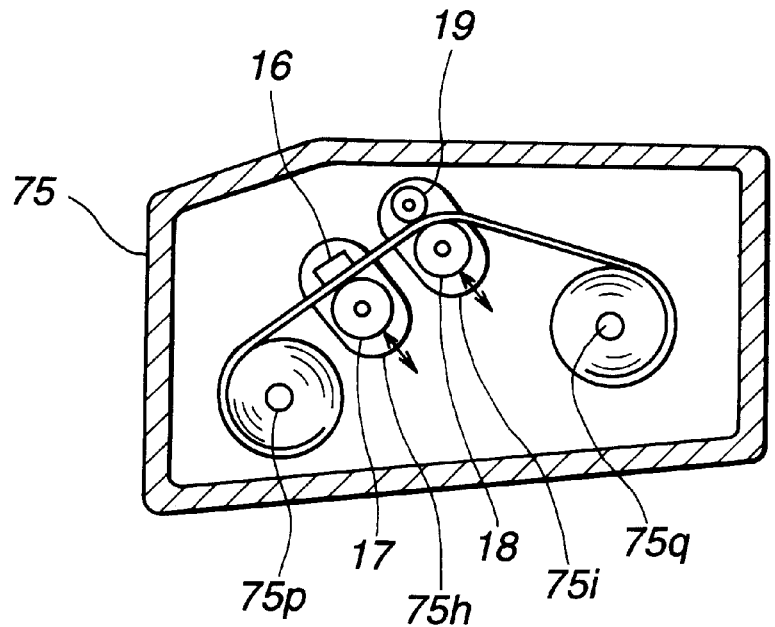
FIG. 43 is a sectional view of a cleaning tape cassette for cleaning a print head and a feed roller which is applicable to the printer incorporated type electronic camera in FIG. 1.

Next, the structure of a cleaning tape cassette for cleaning the print head and the conveyance rollers (the platen roller and the feed roller) will be described. FIG. 43 is a sectional view of the cleaning tape cassette 75 and FIG. 44 is an enlarged sectional view of a cleaning tape 76 applied to the cleaning tape cassette 75.

The cleaning tape cassette 75 includes a roll shaft 75*p* around which the cleaning tape 76 is wound and a rewinding shaft 75*q* for rewinding the tape 76 and openings 75*h*, 75*i* into which the print head 16, the rollers 17, 18 are inserted are formed to a cassette main body.

Figure 44:
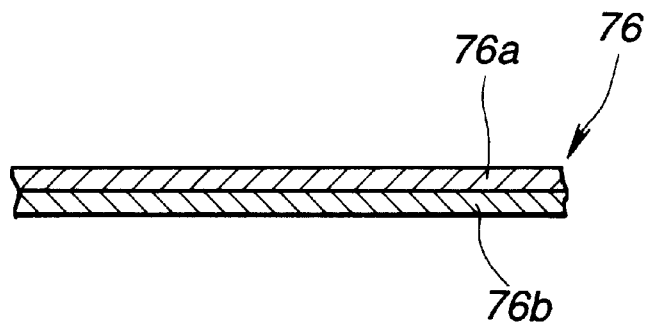
FIG. 44 is an enlarged sectional view of a cleaning tape applied to the cleaning tape cassette in FIG. 43.

As shown in FIG. 44, the cleaning tape 76 to be applied has a two-layer structure composed of a head cleaning tape 76*a* which can be in sliding contact with the print head 16 and a roller cleaning tape 76*b* which can be in sliding contact with the rollers 17, 18.

When the cleaning tape cassette 75 arranged as described above is loaded to the printer incorporated type electronic camera 10 shown in FIG. 2 and the cassette lid 9 is closed, the platen roller 17 and the feed roller 18 move and the cleaning tape 76 is held in the state that it is clamped between the print head 16 and the platen roller 17 and between the roller 19 and the feed roller 18. When the platen roller 17 and the feed roller 18 are rotated in this state, the surfaces of the print head and the respective rollers are cleaned.

According to the cleaning tape cassette, the print head, the rollers and the like in the printer incorporated type electronic camera can be simply cleaned by loading the cassette 75 and driving the rollers. Moreover, since the structure of the cassette 75 is very simple, the cleaning tape cassette can be realized at a low cost. In addition, since the cleaning tape 76 has the two-layer structure composed of the tape for cleaning the head and the tape for cleaning the rollers, the head and the rollers can be simultaneously cleaned.

Next, a thin printer incorporated type electronic camera as a modification of the electronic camera will be described.

The printer incorporated type electronic camera 10 of the embodiment shown in FIG. 2 has such a structure that the direction of the optical axis O of the imaging lens coincides with the lengthwise direction of the camera main body. As shown in FIG. 2, however, there can be proposed a thin type camera as a modification which is arranged such that the optical axis of an imaging lens 8' is in a direction 0' which is perpendicular to the lengthwise direction of the camera main body. In the electronic camera of the modification, since a finder window 11*d* can be disposed to the wider side surface 11*f* of the camera main body, imaging can be easily carried out.

Figure 45:
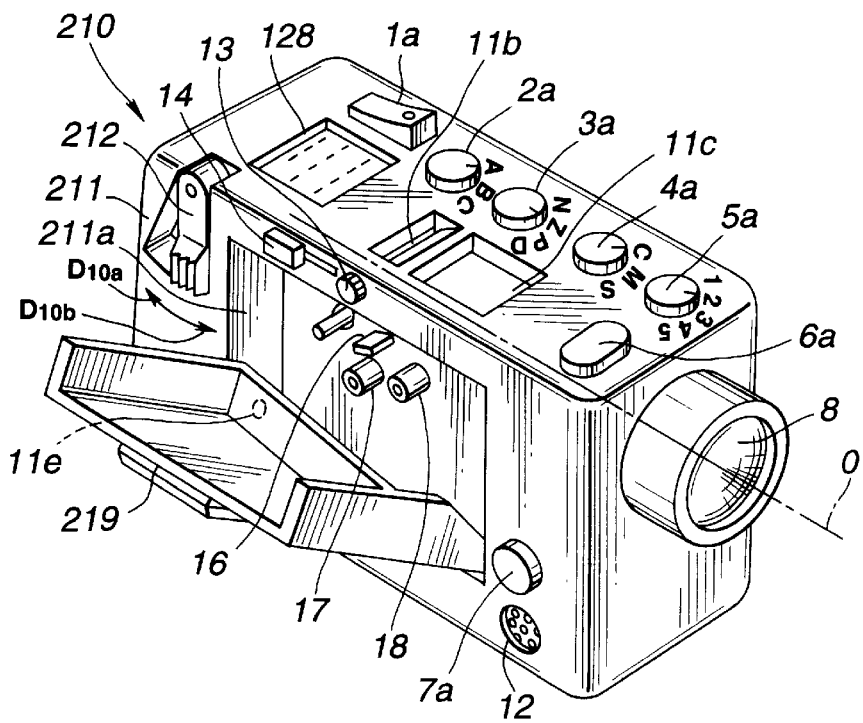
FIG. 45 is a perspective view showing the outside appearance of a camera with a head advancing/retreating operation lever as a modification of the printer incorporated type electronic camera in FIG. 1.

Next, a modification of the printer incorporated type electronic camera with an operation lever for advancing and retreating a press roller to and from the print head will be described. FIG. 45 is a perspective view showing the outside appearance of the printer incorporated type electronic camera 210 of the modification.

The main body 211 of the electronic camera 210 has a longitudinal outside shape similar to the camera main body of the electronic camera in FIG. 2.

The upper surface of the camera main body 211 includes the operation buttons 1*a*–6*a* of a group of switches, that is, a switch SW1–a switch SW6 which are similar to those of the electronic camera in FIG. 2, a discharge port 11*b* and a view port 11*c* disposed thereto. Further, the upper surface includes an LCD display unit 128 disposed thereto which displays various types of processing information such as the remaining recordable number of a recording tape, and the like.

A side surface of the camera main body 211 includes a turnable cassette lid 219 without a cassette holding claw, the operation button 7*a* of a print switch SW7, a connector 12 to be connected to an external device, a cut operation knob 14, a feed changeover knob 13, an operation lever 212 as a turnable operation member for advancing and retreating rollers 17, 18, and the like disposed thereto. A cassette 30 similar to that shown in FIG. 3 is applicable to the electronic camera 210.

In the electronic camera of the modification arranged as described above, the tape cassette 30 is directly loaded to a camera loading portion 211*a* and thereafter the cassette lid 219 is closed. The closing motion is carried out independently without being associated with the loading of the tape cassette 30. The platen roller 17 and the feed roller 18 are still located at retreated positions in this state. When the operation lever 212 is turned in a direction D10*a*, the platen roller 17 and the feed roller 18 are moved so as to be abutted against a print head 16 and a roller 19 through a tape, so that they are set to a print possible state.

When the tape cassette 30 is removed from the camera main body 211, first, the operation lever 212 is returned in a direction D10*b* to thereby retreat the platen roller 17 and the feed roller 18 from the positions where they are abutted against the print head 16 and the roller 19. Then, the tape cassette 30 can be removed by opening the cassette lid 219.

According to the printer incorporated type electronic camera of the modification as described above, since the opening/closing motion of the cassette lid 219 is carried out independently of the loading motion of the tape cassette 30, these operations need not be associated with each other, by which the mechanism of the camera can be simplified. In addition, since the platen roller 17 and the feed roller 18 are directly advanced and retreated by the actuation of the operation lever 212, the advancing/retreating motion is securely carried out. Thus, the platen roller 17 can be smoothly advanced to and retreated from the print head 16.

Figure 46:
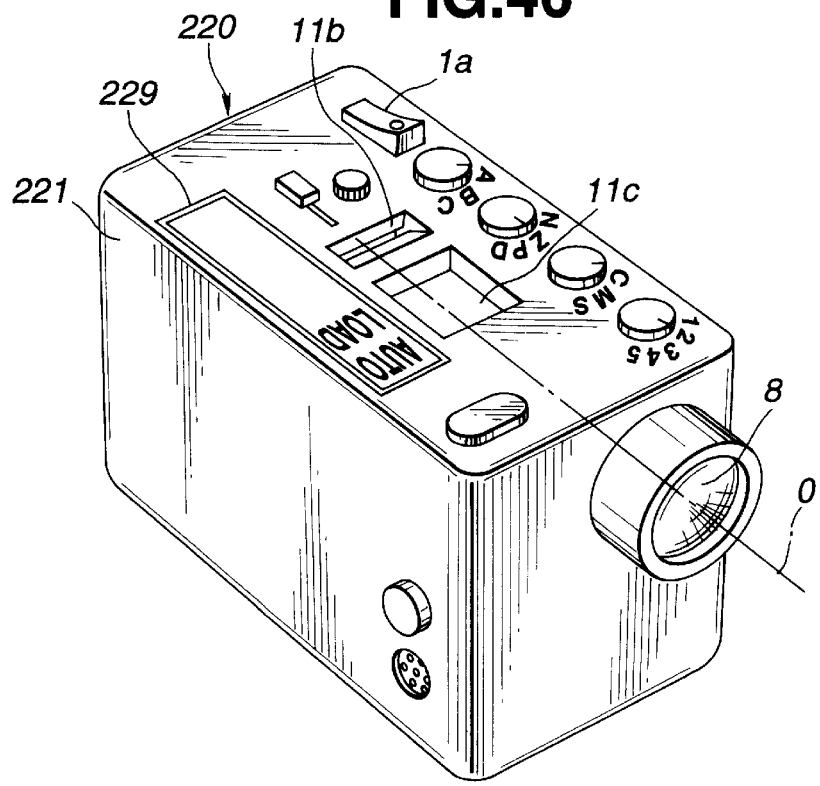
FIG. 46 is a perspective view showing the outside appearance of a camera capable of automatically loading the tape cassette as another modification of the printer incorporated type electronic camera in FIG. 1.

Next, a modification of the printer incorporated type electronic camera employing a cassette automatic loading system will be described. FIG. 46 is a perspective view showing the outside appearance of the printer incorporated type electronic camera 220 of the modification.

The camera main body 211 of the electronic camera 220 has a longitudinal outside appearance similar to that of the camera main body of the electronic camera shown in FIG. 2.

The upper surface of the camera main body 211 includes a group of switches, a discharge port and the like disposed thereto approximately likewise the electronic camera 210 in FIG. 45 except for the LCD display unit. Although a side surface of the camera main body 211 includes a print switch and the like disposed thereon in the same manner, no cassette lid is provided therewith.

A tape cassette 30 approximately similar to that shown in FIG. 3 is applicable to the electronic camera 220 and inserted into the camera main body 211 through a cassette automatic loading/inserting port 229 formed in the upper surface of the camera main body 211. Then, the tape cassette 30 is located at a predetermined loading position by a cassette automatic loading mechanism incorporated in the camera, an ink tape and a recording tape are fed to the positions where they are clamped by a print head, a platen roller and the like, and print is executed.

According to the printer incorporated type electronic camera of the modification as described above, since the tape cassette 30 can be automatically loaded, operation for loading the cassette and opening and closing a cassette lid is not necessary, by which the handiness and ease of use of the camera is improved.

Figure 47:
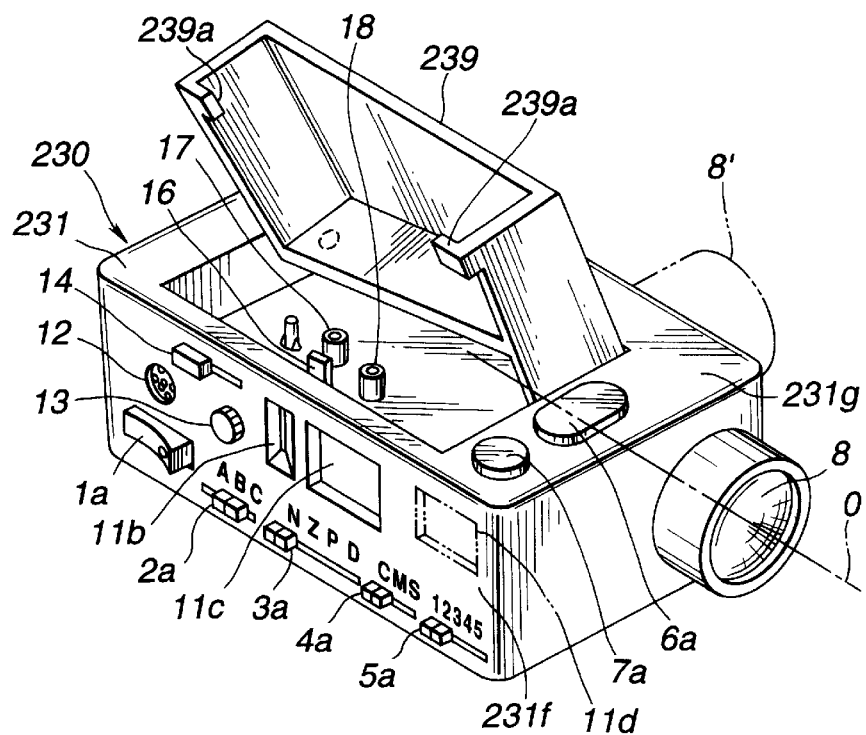
FIG. 47 is a perspective view showing the outside appearance of a lateral type camera as still another modification of the printer incorporated type electronic camera in FIG. 1.

Next, a lateral type camera will be described as an modification of the printer incorporated type electronic camera. FIG. 47 is a perspective view of the outside appearance of the printer incorporated type electronic camera of the modification.

The camera main body 231 of the electronic camera is a lateral type camera main body having a side surface 231f along a vertical direction which is narrower than an upper surface 231g along a horizontal direction when the main body takes such an attitude that the direction of the optical axis O of an imaging lens 8 is directed in a horizontal direction.

In the electronic camera of the modification, it is also possible to dispose a finder window 11d to the narrower side surface 231f of the camera main body and an imaging lens 8' to a surface confronting the side 231f.

The side surface 231f of the camera main body 231 includes the operation buttons 1a–5a of a group of switches SW1–SW5, a tape discharge port 11b, a view port 11c and the like disposed thereto. The upper surface 231g includes the opening 231a of a tape cassette loading portion, a turnable cassette lid 239, the operation buttons 6a, 7a of a two-stage shutter switch SW6 and a print switch SW7a.

The structure and operation of the cassette lid 239 are the same as those of the cassette lid 9 of the electronic camera 10 shown in FIG. 2. The other relating components of the electronic camera have the same structure and operation as those of the electronic camera 10.

According to the printer incorporated type electronic camera of the modification, since the camera main body is arranged as the lateral type, the camera itself can be easily held and imaging can be easily executed.

Figure 48:
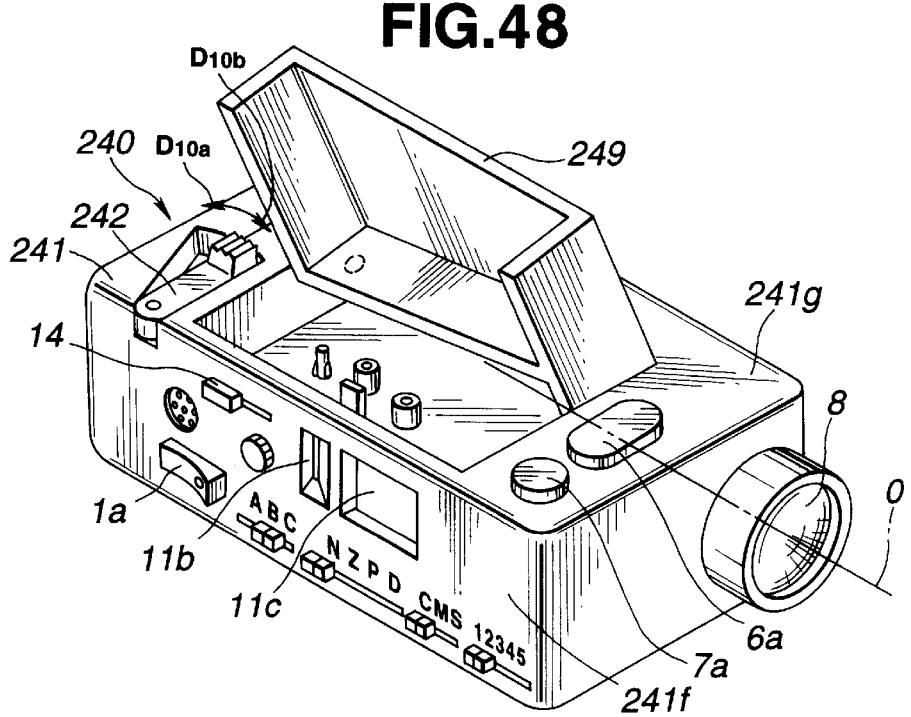
FIG. 48 is a perspective view showing the outside appearance of a lateral type camera with a head advancing/retreating operation lever as a further modification of the printer incorporated type electronic camera in FIG. 1.

Next, a horizontal printer incorporated type electronic camera of another modification will be described. FIG. 48 is a perspective view of the outside appearance of the printer incorporated type electronic camera of the another modification.

The main body 241 of the electronic camera 240 has the same lateral outside shape as that of the camera main body 231 of the electronic camera of the modification in FIG. 47 and is arranged in a manner similar to the electronic camera 230 in FIG. 47 except that an upper surface 241g includes a cassette lid 249 without a cassette holding portion and an operation lever 242 as an operation member disposed thereto.

The operation of the electronic camera of the modification is approximately the same as that of the electronic camera of the modification in FIG. 45. Therefore, according to the printer incorporated type electronic camera of the modification, since the opening/closing motion of the cassette lid 249 is carried out independently of the loading motion of a tape cassette 30, these motions need not be associated with each other and a mechanism is simplified. Since a platen roller and a feed roller are advanced and retreated by the actuation of the operation lever 242, they can be securely advanced and retreated and the platen roller can be also smoothly advanced to and retreated from a print head.

Figure 49:
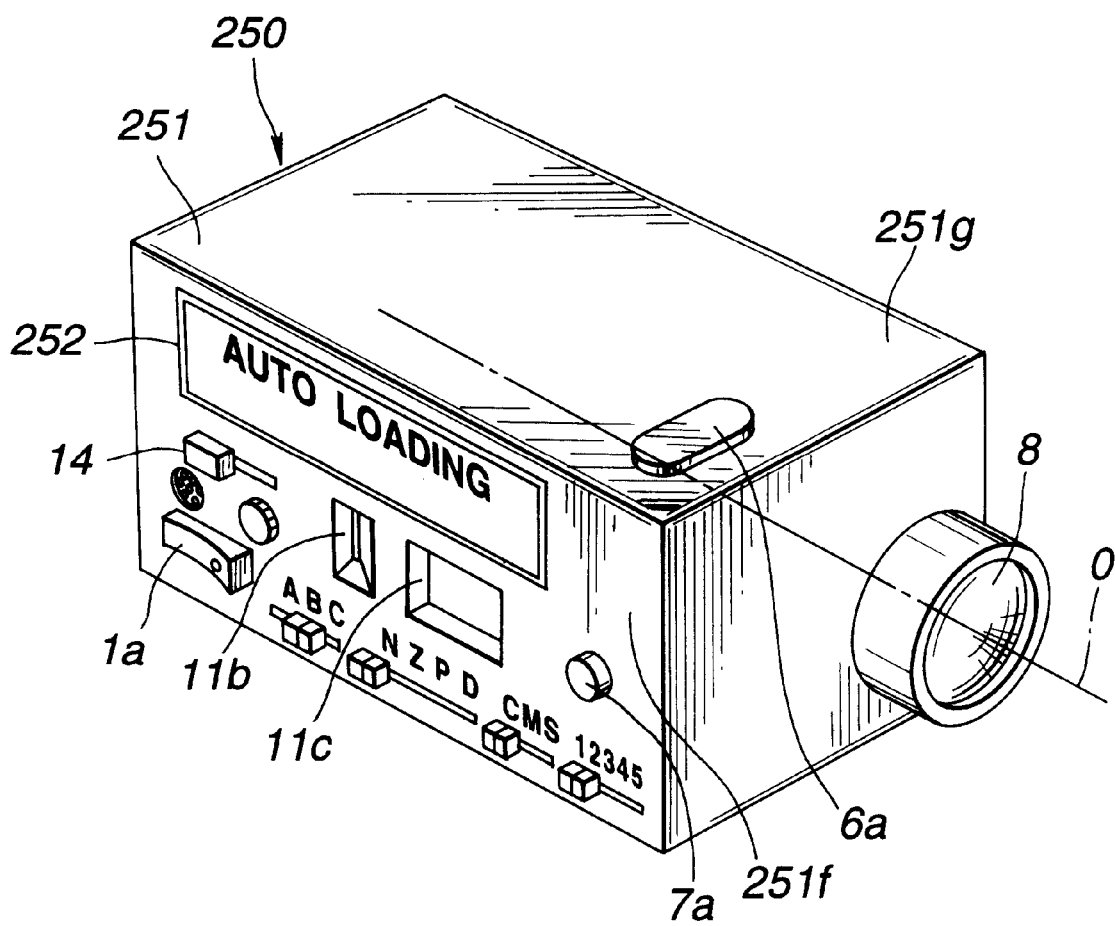
FIG. 49 is a perspective view showing the outside appearance of a lateral type camera capable of automatically loading the tape cassette as a still further modification of the printer incorporated type electronic camera in FIG. 1.

Next, a printer incorporated type lateral electronic camera of still another modification will be described. FIG. 49 is a perspective view of the outside appearance of the printer incorporated type electronic camera of the still another modification.

Although the camera main body 251 of the electronic camera 250 also has the same lateral outside shape as that of the camera main body 231 of the electronic camera of the modification in FIG. 47, no cassette lid is disposed to the upper surface 251g thereof. Further, an automatic cassette loading/inserting port 252 is formed at the side surface 251f of the camera main body 251. The camera main body 251 is provided with the same components as those of the electronic camera 230 in FIG. 47 except the above.

The operation of the electronic camera of the modification is approximately the same as that of the electronic camera of the modification in FIG. 46. Therefore, according to the printer incorporated type electronic camera of the embodiment, since a tape cassette 30 can be automatically loaded, operation for loading the cassette and opening and closing a cassette lid is not necessary, by which the handiness and ease of use of the camera is improved.

There can be also proposed a tape cassette arranged such that a tape having been recorded in the cassette is rewound to visually confirm the printed state of the tape as a modification of the tape cassette 30 as the cassette type member to be recorded shown in the perspective view of FIG. 3. That is, a knob as recording tape carrying means is provided with the tape cassette in FIG. 3 to manually turn the cylindrical core member 34 from the outside.

When the tape having been recorded which is accommodated in the accommodating chamber 31f as the accommodating means is rewound by rotating the cylindrical core member 34 through the knob, the printed state of the tape having been recorded can be visually recognized through an opening 31b as a window. Note, the tape may be rewound and the printed state thereof may be visually recognized in the state that the tape cassette is loaded to the printer incorporated type electronic camera or in the state that it is removed therefrom.

What is claimed is:

1. A printer incorporated type electronic camera having an image data forming unit for forming image data corresponding to an image of a subject imaged by an imaging optical system and a printer unit for printing an image represented by picture data formed by the image forming unit with the image data forming unit and the printer unit being disposed in a case, wherein the printer unit includes a cassette type member to be recorded holding unit for holding a cassette type member to be recorded at a predetermined attitude, the cassette type member to be recorded having a window formed at a predetermined position along an external cover thereof through which a recording surface of a recording tape accommodated in the member to be recorded can be visually recognized, said case being formed to have an approximately-rectangular-prism-like outside shape in which, when the camera takes such an attitude that an optical axis of the imaging optical system is directed in a horizontal direction, at least one side surface of the case along a vertical direction is wider than a bottom surface or upper surface thereof along the horizontal direction, said case having a window disposed at a position thereof enabling the window of the cassette type member to be recorded held by said cassette type member to be recorded holding unit to be viewed from outside of the camera to visually recognize that printing is executed to the recording tape of the cassette type member to be recorded by the print unit.

2. A printer incorporated type electronic camera having an image data forming unit for forming image data corresponding to an image of a subject imaged by an imaging optical system and a printer unit for printing an image represented by picture data formed by the image forming unit with the image data forming unit and the printer unit being disposed in a case, wherein the printer unit includes a cassette type member to be recorded holding unit for holding a cassette type member to be recorded at a predetermined attitude, the cassette type member to be recorded having a window formed at a predetermined position of an external cover thereof through which a recording surface of a recording tape accommodated in the member to be recorded can be visually recognized, said case being formed to have an approximately-rectangular-prism-like outside shape in which, when the camera takes such an attitude that an optical axis of the imaging optical system is directed in a horizontal direction, a bottom surface or upper surface of the case along the horizontal direction is wider than a side surface and back surface thereof along a vertical direction and further the side surface or the back surface has a window disposed at a position thereof enabling the window of the cassette type member to be recorded held by said cassette type member to be recorded holding unit can be viewed from outside of the camera to visually recognize that printing is executed to the recording tape of the cassette type member to be recorded by the print unit.

3. A printer incorporated type electronic camera having an image data forming unit for forming image data corresponding to an image of a subject imaged by an imaging optical system and a printer unit for printing an image represented by the picture data formed by the image forming unit with the image data forming unit and the printer unit being disposed in a case, wherein the printer unit carries out a print operation using a tape cassette in which a recording tape is wound and accommodated and further comprising a feed changeover mechanism for selectively feeding recording tape printed by the printer unit to a first feed mechanism for accommodating the recording tape in the case or the cassette or to a second feed mechanism for feeding the recording paper out of the case.

4. A printer incorporated type electronic camera according to claim 3, wherein said first feed mechanism accommodates the printed recording tape in the cassette and the case is provided with a window for visually recognizing a printed state of the printed recording tape and a visually recognizing conveyor mechanism for conveying the recording tape a predetermined amount for visual recognition thereof.

5. A printer incorporated type electronic camera according to claim 3, wherein said second feed mechanism includes a separation mechanism for separating recording paper of the recording tape from base paper thereof, feeding out only separated recording paper out of the case and winding and accommodating the base paper in the case and a cutter mechanism for cutting recording paper taken fed out of the case.

6. A printer incorporated type electronic camera having an image data forming unit for forming image data corresponding to an image of a subject imaged by an imaging optical system and a printer unit for printing an image represented by the picture data formed by the image forming unit with the image data forming unit and the printer unit being disposed in a main case, wherein the printer unit carries out a print operation within a tape cassette in which the printer unit and a recording tape is wound and accommodated and said main case having a cassette receiving region into which said cassette is removably insertable, said recording tape being arranged such that a cutout is formed in recording paper of the recording tape accommodated therein to permit the recording paper to be easily exfoliated from a base paper corresponding thereto, the recording paper being accommodated by being wound in such a manner that the recording paper is disposed to an outer side of the recording tape and the base paper is disposed on an inner side thereof and a feed passage for guiding the recording tape taken out from the cassette having a maximum radius of curvature which is larger than a maximum radius of curvature of the recording tape wound in the cassette;

and wherein the printer unit has a printer mechanism including a recording tape feed mechanism and a printer head unit and carries out a print operation using the tape cassette in which the recording tape is a heat sensitive recording tape; and wherein the printer head unit includes heating resistors disposed in a line-shape and a head drive unit for driving the heating resistors, a number of elements of each of the heating resistors being smaller than a number of the pixels of the image data formed by the image data forming unit which corresponds to the image in a direction in which the heating resistors are disposed among the images printed by the printer unit, said printer head unit having a controller capable of selectively executing operation in either of two modes, that is, an ordinary operation mode for printing an entire image by the printer unit using approximately all image data of a picture formed by the image data forming unit and a panorama operation mode for creating image data corresponding to a laterally long region in a picture formed by the image data forming unit from the image data of the picture and printing a panorama image by the printer unit using the thus created image data, said controller executing, when the ordinary operation mode is selected, a print operation by subjecting the image data, which formed by the image data forming unit at least in correspondence to the image in the direction in which the heating resistors are disposed, to data subtracting processing and the controller executing, when the panorama operation mode is selected, a print operation using a portion of the image data formed by the image data forming unit without any modification, said used portion of the image data corresponding to the image in the direction in which the beating resistors are disposed.

7. A printer incorporated type electronic camera having an image data forming unit for forming image data corresponding to an image of a subject imaged by an imaging optical system and a printer unit for printing an image represented by the picture data formed by the image forming unit with the image data forming unit and the printer unit being disposed in a main case, wherein the printer unit carries out a print operation within a tape cassette in which the printer unit and a recording tape is wound and accommodated and said main case having a cassette receiving region into which said cassette is removably insertable, said recording tape being arranged such that a cutout is formed in recording paper of the recording tape accommodated therein to permit the recording paper to be easily exfoliated from a base paper corresponding thereto, the recording paper being accommodated by being wound in such a manner that the recording paper is disposed to an outer side of the recording tape and the base paper is disposed on an inner side thereof and a feed passage for guiding the recording tape taken out from the cassette having a maximum radius of curvature which is larger than a maximum radius of curvature of the recording tape wound in the cassette;

and wherein the printer unit has a printer mechanism including a recording tape feed mechanism and a printer bead unit and carries out a print operation using the tape cassette in which the recording tape is a heat sensitive recording tape; and wherein the printer head unit includes heating resistors disposed in a line-shape and a bead drive unit for driving the heating resistors, a number of elements of each of the heating resistors being smaller than a number of pixels of the image data formed by the image data forming unit which corresponds to the image in a direction in which the heating resistors are disposed among the images printed by the printer unit, said printer head unit having a controller capable of selectively executing operation in either of two modes, that is, an ordinary operation mode for printing an entire image by the printer unit using approximately all image data of a picture formed by the image data forming unit and a zoom operation mode for creating image data corresponding to partial regions, which regions are limited in a horizontal direction and a vertical direction, of a picture created by the image data creating unit from the image data of the picture and printing a zoom image by the printer unit using the thus created image data, the controller executing, when the ordinary operation mode is selected, a print operation by subjecting the image data, which is formed by the image data forming unit and corresponding at least to the image in the direction in which the heating resistors are disposed and the image in a direction perpendicular to the above direction, to data subtracting processing and the controller executes, when the zoom operation mode is selected, a print operation using a portion of the image data as it is which is formed by the image data forming unit in correspondence to the image in the direction in which the heating resistors are disposed and the image in the direction perpendicular to the above direction.

8. A cassette type member to be recorded, arranged to be suitable for use with a printer incorporated type electronic camera having an image data forming unit for forming image data corresponding to an image of a subject imaged by an imaging optical system and a printer unit for printing an image represented by picture data formed by the image forming unit with the image data forming unit and the printer unit being disposed in a case and further comprising an accommodation mechanism for accommodating a recording tape fed by a first feed mechanism so that the member to be recorded is suited for use with a printer incorporated type electronic camera which is further provided with a feed changeover mechanism for selectively feeding recording tape printed by the printer unit to the first feed mechanism for accommodating the recording tape in the case or the cassette or to a second feed mechanism for feeding the recording paper out of the case.

9. A member to be recorded according to claim 8, further comprising recording tape conveyor means for manually conveying the recording tape accommodated in said accommodation mechanism by at least an amount necessary to visually recognize a recorded state of the recording tape.

10. A member to be recorded according to claim 8, wherein the cassette type member further comprises a window for visually recognizing a recorded state of the recording tape.

11. A member to be recorded according to claim 8, comprising a cutter mechanism for cutting a recording paper fed out of the cassette type member.

12. A printer incorporated type electronic camera having an image data forming unit for forming image data corresponding to an image of a subject imaged by an imaging optical system and a printer unit for printing an image represented by the picture data formed by the image forming unit with the image data forming unit and the printer unit being disposed in a main case, wherein the printer unit carries out a print operation within a tape cassette in which the printer unit and a recording tape is wound and accommodated and said main case having a cassette receiving region into which said cassette is removably insertable, said recording tape being arranged such that a cutout is formed in recording paper of the recording tape accommodated therein to permit the recording paper to be easily exfoliated from a base paper corresponding thereto, the recording paper being accommodated by being wound in such a manner that the recording paper is disposed to an outer side of the recording tape and the base paper is disposed on an inner side thereof and a feed passage for guiding the recording tape taken out from the cassette having a maximum radius of curvature which is larger than a maximum radius of curvature of the recording tape wound in the cassette;

and wherein the printer unit has a printer mechanism including a recording tape feed mechanism and a printer head unit and carries out a print operation using the tape cassette in which the recording tape and an ink tape are wound and accommodated separately or together; and wherein the printer head unit includes heating resistors disposed in a line shape and a head drive unit for driving the heating resistors, a number of elements of each of the heating resistors being smaller than a number of the pixels of the image data formed by the image data forming unit which corresponds to the image in a direction in which the heating resistors are disposed among the images printed by the printer unit, said printer head unit having a controller capable of selectively executing operation in either of two modes, that is, an ordinary operation mode for printing an entire image by the printer unit using approximately all image data of a picture formed by the image data forming unit and a panorama operation mode for creating image data corresponding to a laterally long region in a picture formed by the image data forming unit from the image data of the picture and printing a panorama image by the printer unit using the thus created image data, said controller executing, when the ordinary operation mode is selected, a print operation by subjecting the image data, which is formed by the image data forming unit at least in correspondence to the image in the direction in which the heating resistors are disposed, to data subtracting processing and the controller executing, when the panorama operation mode is selected, a print operation using a portion of the image data formed by the image data forming unit without any modification, said used portion of the image data corresponding to the image in the direction in which the heating resistors are disposed.

13. A printer incorporated type electronic camera having an image data forming unit for forming image data corresponding to an image of a subject imaged by an imaging optical system and a printer unit for printing an image represented by the picture data formed by the image forming unit with the image data forming unit and the printer unit being disposed in a main case, wherein the printer unit carries out a print operation within a tape cassette in which the printer unit and a recording tape is wound and accommodated and said main case having a cassette receiving region into which said cassette is removably insertable, said recording tape being arranged such that a cutout is formed in recording paper of the recording tape accommodated therein to permit the recording paper to be easily exfoliated from a base paper corresponding thereto, the recording paper being accommodated by being wound in such a manner that the recording paper is disposed to an outer side of the recording tape and the base paper is disposed on an inner side thereof and a feed passage for guiding the recording tape taken out from the cassette having a maximum radius of curvature which is larger than a maximum radius of curvature of the recording tape wound in the cassette;

and wherein the printer unit has a printer mechanism including a recording tape feed mechanism and a printer bead unit and carries out a print operation using the tape cassette in which the recording tape and an ink tape are wound and accommodated separately or together; and wherein the printer head unit includes heating resistors disposed in a line-shape and a head drive unit for driving the heating resistors, a number of elements of each of the beating resistors being smaller than a number of pixels of the image data formed by the image data forming unit which corresponds to the image in a direction in which the heating resistors are disposed among the images printed by the printer unit, said printer head unit having a controller capable of selectively executing operation in either of two modes, that is, an ordinary operation mode for printing an entire image by the printer unit using approximately all image data of a picture formed by the image data forming unit and a zoom operation mode for creating image data corresponding to partial regions, which regions are limited in a horizontal direction and a vertical direction, of a picture created by the image data creating unit from the image data of the picture and printing a zoom image by the printer unit using the thus created image data, the controller executing, when the ordinary operation mode is selected, a print operation by subjecting the image data, which is formed by the image data forming unit and corresponding at least to the image in the direction in which the heating resistors are disposed and the image in a direction perpendicular to the above-direction, to data subtracting processing and the controller executes, when the zoom operation mode is selected, a print operation using a portion of the image data as it is which is formed by the image data forming unit in correspondence to the image in the direction in which the heating resistors are disposed and the image in the direction perpendicular to the above direction.

* * * * *

UNITED STATES PATENT AND TRADEMARK OFFICE
CERTIFICATE OF CORRECTION

PATENT NO. : 6,317,156 B1
DATED : November 13, 2001
INVENTOR(S) : Nagasaki et al.

It is certified that error appears in the above-identified patent and that said Letters Patent is hereby corrected as shown below:

Title page,
Item [75], Inventors, delete "Yokohama", and insert therefor -- Kanagawa --.
Delete "Hachioji", and insert therefor -- Tokyo --.
Delete "Tokorozawa", and insert therefor -- Saitama --.
Delete "Hino", and insert therefor -- Tokyo --.

Column 1,
Line 16, delete the word "manufactures", and insert therefor -- manufacturers --.

Column 9,
Line 48, after the word "formed", delete the word "to".

Column 15,
Line 7, delete the word "taped", and insert therefor -- tape --.
Line 33, after the word "direction", delete "X256", and insert therefor -- X 512 --.
Line 41, delete the phrase "executed to".

Column 30,
Line 50, delete the word "beating", and insert therefor -- heating --.

Column 31,
Line 8, delete the word "bead", and insert therefor -- head --.
Line 12, delete the word "bead", and insert therefor -- head. --.

UNITED STATES PATENT AND TRADEMARK OFFICE
CERTIFICATE OF CORRECTION

PATENT NO. : 6,317,156 B1
DATED : November 13, 2001
INVENTOR(S) : Nagasaki et al.

It is certified that error appears in the above-identified patent and that said Letters Patent is hereby corrected as shown below:

<u>Column 33,</u>
Line 19, delete the word "bead", and insert therefor -- head --.
Line 26, delete the word "beating", and insert therefor -- heating --.

Signed and Sealed this

Ninth Day of March, 2004

JON W. DUDAS
*Acting Director of the United States Patent and Trademark Office*